(12) United States Patent
Lu et al.

(10) Patent No.: US 8,756,181 B2
(45) Date of Patent: Jun. 17, 2014

(54) SYSTEM AND METHOD EMPLOYING A SELF-ORGANIZING MAP LOAD FEATURE DATABASE TO IDENTIFY ELECTRIC LOAD TYPES OF DIFFERENT ELECTRIC LOADS

(75) Inventors: Bin Lu, Shanghai (CN); Ronald G. Harley, Lawrenceville, GA (US); Liang Du, Atlanta, GA (US); Yi Yang, Milwaukee, WI (US); Santosh K. Sharma, Maharashtra (IN); Prachi Zambare, Maharashtra (IN); Mayura A. Madane, Maharashtra (IN)

(73) Assignees: Eaton Corporation, Cleveland, OH (US); Georgia Tech Research Corporation, Atlanta, GA (US)

( * ) Notice: Subject to any disclaimer, the term of this patent is extended or adjusted under 35 U.S.C. 154(b) by 138 days.

(21) Appl. No.: 13/304,758

(22) Filed: Nov. 28, 2011

(65) Prior Publication Data

US 2013/0138651 A1     May 30, 2013

(51) Int. Cl.
*G06F 17/30* (2006.01)
(52) U.S. Cl.
USPC .......................................................... 706/15
(58) Field of Classification Search
CPC ................................................... G06N 3/088
USPC .......................................................... 706/15
See application file for complete search history.

(56) References Cited

U.S. PATENT DOCUMENTS

| 4,858,141 | A | 8/1989 | Hart et al. |
| 5,483,153 | A | 1/1996 | Leeb et al. |
| 5,717,325 | A | 2/1998 | Leeb et al. |
| 5,835,901 | A | * 11/1998 | Duvoisin et al. ................ 706/19 |
| 5,910,875 | A | 6/1999 | Tian et al. |

(Continued)

FOREIGN PATENT DOCUMENTS

| GB | 2465367 A | 5/2010 |
| WO | 2010/005985 A1 | 1/2010 |

OTHER PUBLICATIONS

Lubkeman et al., Unsupervised learning strategies for the detection and classification of transient phenomena on electric power distribution systems, Proceedings of the First International Forum on Applications of Neural Networks to Power Systems, pp. 107-111 (1991).*

(Continued)

*Primary Examiner* — Kakali Chaki
*Assistant Examiner* — Michael Zidanic
(74) *Attorney, Agent, or Firm* — Eckert Seamans Cherin & Mellott, LLC; Kirk D. Houser

(57) ABSTRACT

A method identifies electric load types of a plurality of different electric loads. The method includes providing a self-organizing map load feature database of a plurality of different electric load types and a plurality of neurons, each of the load types corresponding to a number of the neurons; employing a weight vector for each of the neurons; sensing a voltage signal and a current signal for each of the loads; determining a load feature vector including at least four different load features from the sensed voltage signal and the sensed current signal for a corresponding one of the loads; and identifying by a processor one of the load types by relating the load feature vector to the neurons of the database by identifying the weight vector of one of the neurons corresponding to the one of the load types that is a minimal distance to the load feature vector.

2 Claims, 13 Drawing Sheets

(56) References Cited

U.S. PATENT DOCUMENTS

| | | | |
|---|---|---|---|
| 6,081,123 | A | 6/2000 | Kasbarian et al. |
| 7,268,989 | B2 | 9/2007 | Parker et al. |
| 7,362,552 | B2 | 4/2008 | Elms et al. |
| 2009/0072985 | A1 | 3/2009 | Patel et al. |

OTHER PUBLICATIONS

Prudenzi, A neuron nets based procedure for identifying domestic appliances pattern-of-use from energy recordings at meter panel, Power Engineering Society Winter Meeting (2002).*

Daponte et al., Artificial neural networks in measurements, Measurement 23, 93-115 (1998).*

Germen et al., Self organizing map (SOM) approach for classification of power quality events, ICANN 2005, LNCS 3696, pp. 403-408 (2005).*

Verdú et al., Classification, filtering, and identification of electrical customer load patterns through the use of self-organizing maps, IEEE Transaction of Power Systems, vol. 21, No. 4, 1672-1682 (2006).*

Srinivasan et al., Neural-network-based signature recognition for harmonic source identification, IEEE Transaction on Power Delivery, vol. 21, No. 1, 398-405 (1996).*

Energy Circle, "TED 5000 Series: The Energy Detective Electricity Monitor", http://www.energycircle.com/shop/ted-5000-g-with-google-power-meter.html, 2011, 5 pp.

Lam, H.Y., et al., "A Novel Method to Construct Taxonomy of Electrical Appliances Based on Load Signatures", IEEE Transactions on Consumer Electronics, vol. 53, No. 2, May 2007, p. 653-60.

Hart, G.W., "Nonintrusive Appliance Load Monitoring", Proceedings of the IEEE, vol. 80, Dec. 1992, pp. 1870-1891.

Drenker, S., et al., "Nonintrusive Monitoring of Electric Loads", IEEE Computer Applications in Power, vol. 12, No. 4, 1999, pp. 47-51.

Marceau, M.L., et al., "Nonintrusive load disaggregation computer program to estimate the energy consumption of major end uses in residential buildings", Energy Conversion and Management, vol. 41, 2000, pp. 1389-1403.

Cole, A., et al., "Nonintrusive Identification of Electrical Loads in a Three-Phase Environment Based on Harmonic Content", Proc. IEEE Instrumentation and Measurement Technology Conference, IMTC 2000, vol. 1, May 1-4, 2000, pp. 24-29.

Chan, W.L., et al., "Harmonics Load Signature Recognition by Wavelets Transforms", Proc. International Conference on Electric Utility Deregulation and Restructuring and Power Technologies, DRPT 2000, Apr. 4-7, 2000, pp. 666-671.

Shaw, S.R., et al., "Nonintrusive Load Monitoring and Diagnostics in Power Systems", IEEE Transactions on Instrumentation and Measurement, vol. 57, No. 7, Jul. 2008, pp. 1445-1454.

Kohonen, T., "Self-Organizing Maps", Third Edition: Springer, 2001, ISBN: 3-540-67921-9, pp. i-ii; 104-37.

Chesnut, C., "Self Organizing Map AI for Pictures", http://www.generation5.org/content/2004/aiSomPic.asp, 2004, 16 pp.

Mahalanobis, P.C., "On the Generalized Distance in Statistics", Proceedings of the National Institute of Sciences of India, vol. II—No. 1, 1936, pp. 49-55.

Theodoridis, S., et al., "Pattern Recognition", Fourth Ed., Academic Press, 2009, ISBN: 978-1-59749-2720, pp. i-iii; 20-39 and 58-61.

Wikipedia Foundation, Inc., "Self-organizing map", http://en.wikipedia.org/wiki/Self-organizing_map, Oct. 6, 2011, 7 pp.

Y. Du et al., "A Review of Identification and Monitoring Methods for Electric Loads in Commercial and Residential Buildings", Proceedings of the 2010 IEEE Energy Conversion Congress and Exposition, Sep. 12, 2010, pp. 4527-4533.

Y.-H. Lin et al., "Applications of Hierarchical Support Vector Machines for Identifying Load Operation in Nonintrusive Load Monitoring Systems", Proceedings of the 8th World Congress on Intelligent Control and Automation, Jun. 21, 2011, pp. 688-693.

H.-T. Yang et al., "Design a Neural Network for Features Selection in Non-intrusive Monitoring of Industrial Electrical Loads", Proceedings of the 11th International Conference on Computer Supported Cooperative Work in Design, 2007, pp. 1022-1027.

A. Prudenzi, "A Neuron Nets Based Procedure for Identifying Domestic Appliances Pattern-of-Use from Energy Recordings at Meter Panel", Proceedings of the 2002 IEEE Power Engineering Society Winter Meeting, 2002, pp. 941-946.

J. Roos et al., "Using Neural Networks for Non-intrusive Monitoring of Industrial Electrical Loads", Proceedings of the IEEE Instrumentation and Measurement Technology Conference, 1994, pp. 1115-1118.

M. Endo et al., "Clustering Method using Self-Organizing Map", Proceedings of the 2000 IEEE Signal Processing Society Workshop on Neural Networks for Signal Processing, 2000, pp. 261-270.

J. Costa et al., "Automatic Data Classification by a Hierarchy of Self-Organizing Maps", Proceedings of the 1999 IEEE International Conference on Systems, Man, and Cybernetics, 1999, pp. 419-424.

S. Chen et al., "Implementation of a Virtual-Instrument for Non-intrusive Intelligent Real-Time Load Monitoring", Proceedings of the lasted International Conference on Neural Networks and Computational Intelligence, 2003, pp. 174-178.

European Patent Office, "International Search Report and Written Opinion", Oct. 18, 2013, 13 pp.

* cited by examiner

| LAYER 1 - LOAD CATEGORY | LAYER 2 - LOAD SUB-CATEGORY | LAYER 3 - LOAD TYPE |
|---|---|---|
| R: RESISTIVE LOADS | R1: LIGHTING TOOLS | INCANDESCENT LAMPS (<100 W) |
| | R2: KITCHEN APPLIANCES/PERSONAL CARE APPLIANCES | BREAD TOASTER<br>SPACE HEATER<br>APPLIANCES |
| X: REACTIVE LOADS | X1: LINEAR REACTIVE LOADS | FANS |
| | X2: NONLINEAR WITH MACHINE SATURATIONS | VENDING MACHINE<br>SHREDDER<br>REFRIGERATOR (WITH CHILLER) |
| P: NONLINEAR W/ PFC | P1: LARGE MONITORS/TVs EQUIPMENT | BIG TVs/MONITORS (LCD/LED) (>75 W) |
| | P2: OTHER LARGE CONSUMER ELECTRONIC DEVICES | PC (DESKTOP/LAPTOP) (>75 W)<br>PROJECTORS<br>HOME THEATER/GAME CONSOLES (70 W-80 W) |
| NP: NONLINEAR W/O PFC | NP1: IMAGING EQUIPMENT | PORTABLE MFD/PRINTER/SCANNER |
| | NP2: SMALL MONITORS/TVs | PC MONITORS/TVs |
| | NP3: PCs | PC (DESK/LAPTOP) (< 75 W) |
| | NP4: ELECTRONIC LOADS WITH BATTERY CHARGER | CELLPHONE/PDA CHARGERS |
| | NP5: LIGHTING LOADS | FL/CFL |
| | NP6: OTHER SMALL ELECTRONIC DEVICES | DVD PLAYER; SET TOP BOX |
| T: NONLINEAR W/ TXM | T1: SMALL ELECTRONICS W/O BATTERY CHARGER | STAPLERS<br>COMPUTER SPEAKERS |
| | T2: W/ BATTERY CHARGER | AA BATTERY CHARGER |
| PAC: NONLINEAR W/ PHASE ANGLE CONTROL | | LIGHTING LOADS WITH DIMMER |
| | | SPACE HEATERS/FANS WITH PHASE ANGLE CONTROLLED RECTIFIER |
| M: COMPLEX STRUCTURE | M1: MICROWAVE OVEN | MICROWAVE OVEN |
| | M2: R + NP | MFD/PRINTER/COPIER/FAX MACHINES |
| | M3: PAC + NP | MFD/PRINTER/COPIER/FAX MACHINES |

*FIG.2*

SYSTEM AND METHOD EMPLOYING A SELF-ORGANIZING MAP LOAD FEATURE DATABASE TO IDENTIFY ELECTRIC LOAD TYPES OF DIFFERENT ELECTRIC LOADS

This invention was made with Government support under DE-EE0003911 awarded by the Department of Energy National Energy Technology Laboratory. The Government has certain rights in this invention.

CROSS-REFERENCE TO RELATED APPLICATIONS

This application is related to commonly assigned, copending U.S. patent application Ser. No. 13/304,783, filed Nov. 28, 2011, entitled "System And Method Employing A Hierarchical Load Feature Database To Identify Electric Load Types Of Different Electric Loads"; and U.S. patent application Ser. No. 13/304,834, filed Nov. 28, 2011, entitled "System And Method Employing A Minimum Distance And A Load Feature Database To Identify Electric Load Types Of Different Electric Loads".

BACKGROUND

1. Field

The disclosed concept pertains generally to electric loads and, more particularly, to methods of identifying electric load types of electric loads. The disclosed concept also pertains to systems for identifying electric load types of electric loads.

2. Background Information

Electricity usage costs have become an increasing fraction of the total cost of ownership for commercial buildings. At the same time, miscellaneous electric loads (MELs) account for about 36% of electricity consumption of commercial buildings. Effective management of MELs could potentially improve energy savings of buildings up to about 10%. However, power consumption monitoring and energy management of MELs inside commercial buildings is often overlooked. In order to provide the MELs' energy consumption conditions by load type to a building automation system (BAS), and, consequently, to manage the MELs and reduce energy consumption inside commercial buildings, there is a need to identify the MELs.

Lam, H. Y. et al., "A novel method to construct taxonomy of electrical appliances based on load signatures," IEEE Transactions on Consumer Electronics, vol. 53, no. 2, 2007, p. 653-60, discloses that a load signature is an electrical expression that a load device or appliance distinctly possesses. Load signatures can be applied to produce many useful services and products, such as, determining the energy usage of individual appliances, monitoring the health of critical equipment, monitoring power quality, and developing facility management tools. Load signatures of typical yet extensive loads are needed to be collected before applying them to different services and products. As there are an enormous number of electrical appliances, it is beneficial to classify the appliances for building a well-organized load signature database. A method to classify the loads employs a two-dimensional form of load signatures, voltage-current (V-I) trajectory, for characterizing typical household appliances. A hierarchical clustering method uses a hierarchical decision tree or dendrogram to show how objects are related to each other. Groups of the objects can be determined from the dendrogram, to classify appliances and construct the taxonomy of the appliances. The taxonomy based on V-I trajectory is compared to the taxonomies based on traditional power metrics and eigenvectors in prior studies.

In this taxonomy approach, only one set of load features is utilized, and the hierarchical structure of appliances, a dendrogram, is based on the selection of a distance value/threshold between the groups in each level, or the height of a cluster tree. In this approach, the selection of the distance/height will affect how the hierarchical tree is built.

It is known to capture the unique characteristics (e.g., without limitation, voltage; current; power of plugged loads at a power outlet or receptacle) of MELs.

The power usage monitoring of MELs by types in residential/commercial buildings provides an opportunity to effectively manage MELs and potentially improve energy savings of buildings. This needs an accurate and un-ambiguous identification of MELs that are plugged into power outlets.

To successfully identify MELs, the biggest challenge is to distinguish the loads with the most similarity, for example and without limitation, a DVD, a set-top box, and a PC monitor (e.g., without limitation, those using a standardized DC power supply, and current harmonic reduction techniques). It is believed that this difficulty has not been explicitly addressed and solved by known techniques.

Known proposals for detecting single-phase electric loads are based on voltage, current and/or power measurements, including, relative position in an active-reactive power plane (P-Q plane); variation in active and reactive power at different operating conditions; harmonic power contents and harmonic currents; steady-state two-dimensional voltage-current (V-I) trajectories; instantaneous power; instantaneous admittance; and power factor. However, it is believed that these proposals suffer from several serious disadvantages in their accuracy, robustness and applicability, including: (1) MELs with different voltage and current characteristics may be grouped together by the identifier if they consume approximately the same amount of active and reactive power; (2) MELs of same type may be grouped separately by the identifier if they have different power ratings; (3) steady-state operation is usually required for load detection, while many buildings' loads are dynamic in nature; and (4) MELs with similar current features cannot be distinguished, such as DVD players and set-top boxes, MELs with the same type of DC power supply, or other standardized power electronics interface circuits. These disadvantages together with the lack of an intelligent power outlet/strip capable of acquiring signals and processing algorithms have impeded the applications of these methods.

A self-organizing map (SOM) (also known as a self-organizing feature map (SOFM)) is a type of unsupervised artificial neural network that is trained using competitive learning to produce a relatively low-dimensional (typically two-dimensional), discretized representation of the input space of training samples, called a map. Self-organizing maps are different from other artificial neural networks in the sense that they use a neighborhood function to preserve the topological properties of the input space. This makes SOMs useful for visualizing relatively low-dimensional views of relatively high-dimensional data, akin to multidimensional scaling.

A self-organizing map consists of components called neurons (also known as nodes). Associated with each node is a weight vector of the same dimension as the input data vectors and a position in the map space. The usual arrangement of nodes is a regular spacing in a hexagonal or rectangular grid. The SOM describes a mapping from a relatively higher dimensional data (or input) space to a relatively lower dimensional map space. The procedure for placing a vector from the data space onto the map is to first find the node with the closest weight vector to the vector taken from the data space. Once the closest node is located it is assigned the values from the vector taken from the data space, and this node is also called a "winner-neuron". All the neurons within the winner's radius, defined by the neighborhood function, will update their weights as well. This method of training is called a "winner-takes-all" strategy.

A unified distance matrix (U-Matrix) is a common way to represent the information of the trained SOM. A U-Matrix value of a particular node is the average distance between the node and its closest neighbors. The number of the closest neighbor depends on its neighborhood topology. In a square grid for instance, the closest four or eight nodes (the Von Neumann neighborhood and Moore neighborhood, respectively) might be considered, or six nodes in a hexagonal grid. The distance between the adjacent neurons (or nodes) is presented with different colorings or gray scales. A dark coloring between the neurons corresponds to a relatively large distance and, thus, a gap between the vectors in the input data space. A light coloring between the neurons signifies that the vectors are relatively close to each other in the input data space. Light areas can be thought of as clusters and dark areas as cluster separators (or boundary regions). This way of representation is very helpful to find out clusters in the input data without having any a priori information about the clusters (e.g., in an unsupervised manner).

One of the biggest advantages of SOM is that it preserves statistical and topological information of the input data space, and classifies all training data into several groups by their inherent relationships, known as "clustering by nature". As it thereby compresses information, while preserving the most important topological and metric relationships, the SOM can also be considered to produce some degree of abstractions.

SOM is an ideal self-clustering tool, but is not believed to be an effective classifier for the purpose of load identification.

There is room for improvement in methods of identifying electric load types of electric loads.

There is further room for improvement in systems for identifying electric load types of electric loads.

SUMMARY

The advantage of SOM producing some degree of abstractions is especially beneficial to MELs identification, because the resultant SOM map provides a natural tolerance to the possible diversities of the same load type, but from different MEL manufacturers with different power ratings.

The above needs and others are met by embodiments of the disclosed concept, which employ a self-organizing map load feature database of a plurality of different electric load types and a plurality of neurons, each of the different electric load types corresponding to a number of the neurons, and employing a weight vector for each of the neurons.

In accordance with one aspect of the disclosed concept, a method of identifying electric load types of a plurality of different electric loads comprises: providing a self-organizing map load feature database of a plurality of different electric load types and a plurality of neurons, each of the different electric load types corresponding to a number of the neurons; employing a weight vector for each of the neurons; sensing a voltage signal and a current signal for each of the different electric loads; determining a load feature vector comprising at least four different load features from the sensed voltage signal and the sensed current signal for a corresponding one of the different electric loads; and identifying by a processor one of the different electric load types by relating the load feature vector to the neurons of the self-organizing map load feature database by identifying the weight vector of one of the neurons corresponding to the one of the different electric load types that is a minimal distance to the load feature vector.

As another aspect of the disclosed concept, a system comprises: a self-organizing map load feature database of a plurality of different electric load types and a plurality of neurons, each of the different electric load types corresponding to a number of the neurons, each of the neurons having a corresponding weight vector; a plurality of sensors structured to sense a voltage signal and a current signal for each of the different electric loads; and a processor structured to: determine a load feature vector comprising at least four different load features from the sensed voltage signal and the sensed current signal for a corresponding one of the different electric loads, and identify one of the different electric load types by relating the load feature vector to the neurons of the self-organizing map load feature database by identifying the weight vector of one of the neurons corresponding to the one of the different electric load types that is a minimal distance to the load feature vector.

BRIEF DESCRIPTION OF THE DRAWINGS

A full understanding of the disclosed concept can be gained from the following description of the preferred embodiments when read in conjunction with the accompanying drawings in which:

FIG. 2 is a representation of a hierarchical load feature database of FIG. 1.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

The disclosed concept is described in association with example loads and example load features, although the disclosed concept is applicable to a wide range of loads and a wide range of load features.

The disclosed concept provides a method and system to identify electric load types, load operating modes and/or load health, by utilizing voltage and current signals of loads and suitable data processing and/or pattern recognition processes. This enables a wide range of MELs' identification technologies and MELs energy management applications.

Figure 1:
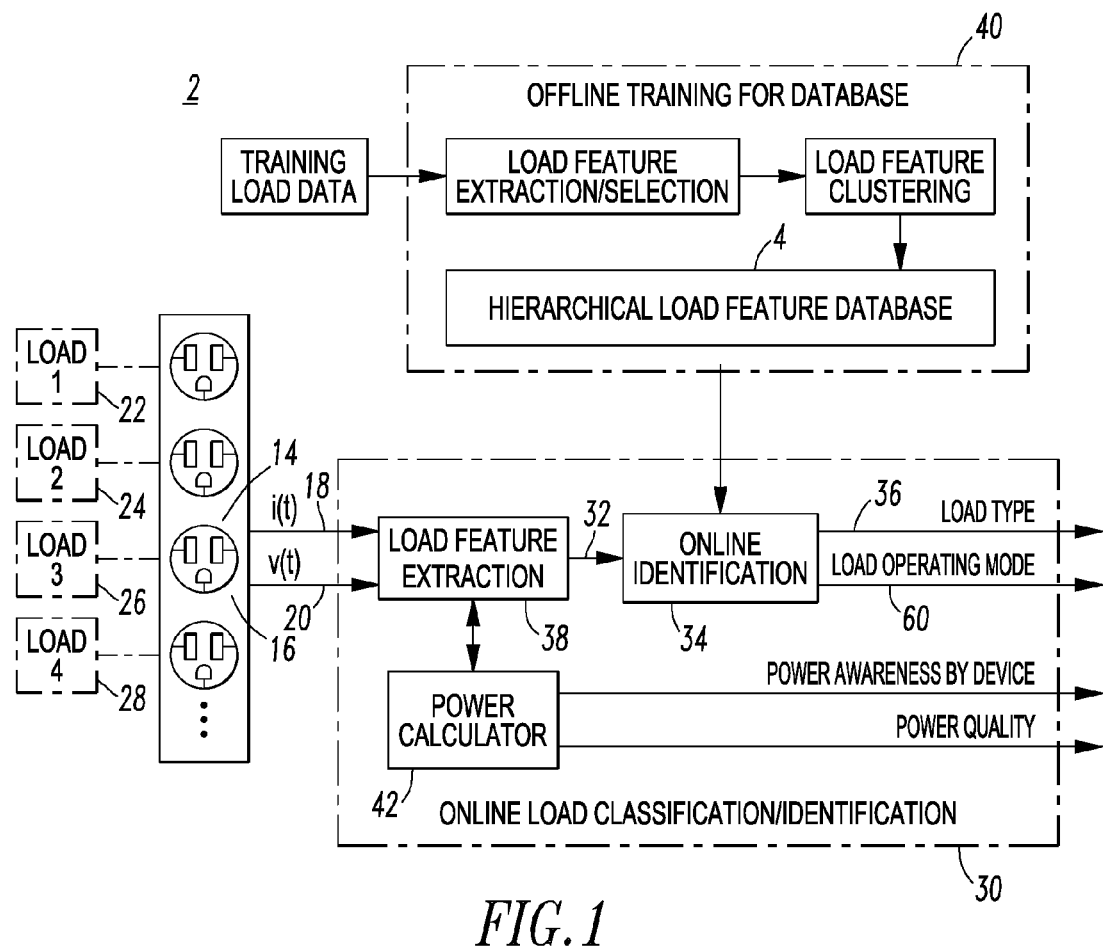
FIG. 1 is a block diagram of a system to identify miscellaneous electric loads (MELs) in accordance with embodiments of the disclosed concept.

Referring to FIG. 1, an example MELs identification system 2 is shown. The system 2 includes a hierarchical load feature database 4 comprising a plurality of layers (non-limiting examples of which are shown in FIG. 2 as layers 6,8,10, it being appreciated that more than three layers can be employed). One of the example layers 10 of FIG. 2 includes a plurality of different example electric load types 12. A plurality of sensors, such as the example current sensor 14 and the example voltage sensor 16 for one load, are structured to sense a current signal (i(t)) 18 and a voltage signal (v(t)) 20 for each of a plurality of different electric loads (four different example loads 22,24,26,28 are shown in phantom line drawing, it being appreciated that any number of loads can be employed).

The system 2 also includes a processor 30 structured to determine at least four different load features 32 from the sensed voltage signal 20 and the sensed current signal 18 for a corresponding one of the different electric loads (e.g., example load 26, as shown), and identify (at the example online identification process 34) a load type 36 of the different electric load types 12 by relating the different load features 32 to the hierarchical load feature database 4.

As will be explained, each of a plurality of the layers 6,8,10 of FIG. 2 includes a corresponding load feature set, and the corresponding load feature set of at least one of the layers 6,8,10 (e.g., without limitation, layer 6) is different from the corresponding load feature set of at least another one of the layers 6,8,10 (e.g., without limitation, layer 8 or layer 10).

The example system 2 includes the electrical sensors 14,16 coupled to a power circuit (e.g., to sense voltage, current and power of plugged loads, such as example loads 22,24,26,28, at a power outlet, intelligent receptacle, panelboard or load center, it being appreciated that a wide range of different power circuits can be employed). A load feature extractor 38 acquires load electrical signatures in the form of a relatively high-dimensional feature vector, which in this example is the at least four different load features 32. The hierarchical load feature database 4, which is preferably scalable, is obtained from an offline training process 40. The online identification process 34 identifies the electric load type 36 by relating the high-dimensional feature vector to the hierarchical load feature database 4.

Any suitable processor (e.g., without limitation, a processor of a receptacle; a processor of a power strip; a processor of a panelboard or load center; a processor of a building or energy management system; a networked processor) runs the example offline training process 40 for the hierarchical load feature database 4.

Any suitable processor (e.g., without limitation, a processor of a receptacle; a processor of a power strip; a processor of a panelboard or load center; a processor of a building or energy management system; a networked processor) runs the example online load classification/identification process 34.

The processor 30 can include an optional power calculator 42 used to calculate power related quantities (e.g., without limitation, load current RMS values; real power consumption; power factor). The power calculator 42 provides continuous power monitoring for various loads of interest, and also facilitates load feature extraction when load identification is needed.

Example features for the example first layer 6 of the hierarchical load feature database 4 of FIG. 2 include: true power factor (PF) (e.g., ratio of the real power flowing to a load to the apparent power in the power circuit; a dimensionless number between 0 and 1 (or a percentage, e.g., 0.5 PF=50% PF)), displacement power factor (e.g., in linear circuits having only sinusoidal currents and voltages of one frequency, the power factor arises only from the difference in phase between the current and voltage), current total harmonic distortion (THD), normalized admittance, and V-I trajectory graphical representations (e.g., without limitation, area; number of segments; polynomial coefficients) as are discussed in detail, below.

Example features for example second layer 8 of the hierarchical load feature database 4 of FIG. 2 include: appliances power (or nominal power), distortion power factor, current THD, V-I trajectory graphical representations (e.g., without limitation, polynomial coefficients, thinness ratio), normalized third and fifth harmonics of voltage and current, and high-frequency components of voltage and current signals.

The distortion power factor (I1,rms/Irms) describes how the harmonic distortion of a load current decreases the average power transferred to the load. THDi is the total harmonic distortion of the load current. This assumes that the voltage stays undistorted (i.e., sinusoidal, without harmonics). This simplification is often a good approximation in practice. I1,rms is the fundamental component of the current and Irms is the total current, both of which are root mean square values.

The distortion power factor when multiplied by the displacement power factor is the overall, true power factor or just power factor (PF).

Example features for the example third layer 12 of the hierarchical load feature database 4 of FIG. 2 include: transient on/off behavior (e.g., without limitation, short-term harmonic contents; transient energy content); event detection (e.g., load turn on/off behaviors; load power fluctuation), and long-term operating mode patterns (e.g., without limitation, operating current/power profile of loads).

Another example load feature, K-factor, is linked with harmonic content of current, and represents a heating effect due to distorted current (e.g., for a supply transformer). K-factor is defined by Equation 1.

$$K\text{-factor} = (I_1^2 + (I_2 * 2)^2 + (I_3 * 3)^2 + \ldots (I_n * n)^2)/(I_1^2 + I_2^2 + I_3^2 + \ldots I_n^2) \quad \text{(Eq. 1)}$$

wherein:

$I_1$, $I_2$ and $I_3$ are first, second and third order current harmonics, respectively; and $I_n$ is the nth order current harmonic.

As the harmonic content of total $I_{rms}$ approaches zero, K-factor approaches one.

An example load feature, Area, refers to the area enclosed by a V-I trajectory. Area is proportional to the magnitude of the phase shift between the voltage and the current. If current leads voltage, then Area has a positive sign. If current lags voltage, then Area becomes negative. Area is directly calculated from the coordinates of the voltage and current points, $(x_i, y_i)$, on the V-I trajectory. The area, A, is given by Equation 2.

$$A = \frac{1}{2} \sum_{i=0}^{N-1} (x_i y_{i+1} - x_{i+1} y_i) \qquad \text{(Eq. 2)}$$

wherein:
N is the integer number of samples;
$x_i$ is a sample of voltage instantaneous value; and
$y_i$ is a sample of current instantaneous value.

Figure 3:
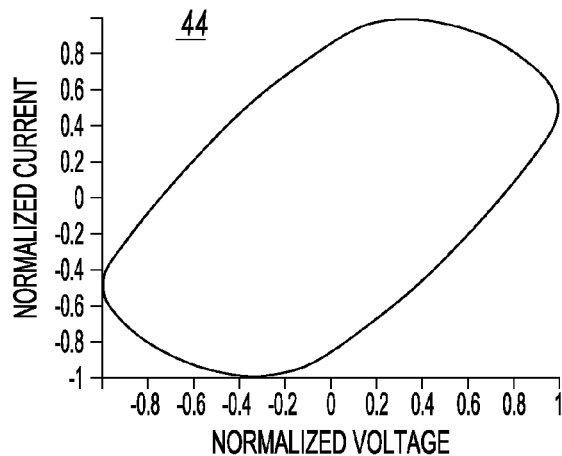
FIG. 3 is a plot of a voltage-current (V-I) trajectory of a portable fan.

FIG. 3 shows an example V-I trajectory 44 of a portable fan. Here, the calculated Area value is 2.4.

Another example load feature eccentricity, E, is the measure of the aspect ratio of a shape, and is the ratio of the length of the major axis to the length of the minor axis. This feature helps to identify the shape of the waveform. Eccentricity is calculated from Equations 3-5.

Equation 3 provides the covariance matrix, C, of the shape.

$$C = \frac{1}{N} \sum_{i=0}^{N-1} \begin{pmatrix} x_i - g_x \\ y_i - g_y \end{pmatrix} \begin{pmatrix} x_i - g_x \\ y_i - g_y \end{pmatrix}^T \qquad \text{(Eq. 3)}$$

$$= \begin{pmatrix} C_{xx} & C_{xy} \\ C_{yx} & C_{yy} \end{pmatrix}$$

wherein:
N is the integer number of samples;
$x_i$ is a sample of voltage instantaneous value;
$y_i$ is a sample of current instantaneous value;
T in Equation 3 is the matrix transpose operator;
$(g_x, g_y)$ is the centroid of the V-I trajectory; and $$C_{xx} = \frac{1}{N} \sum_{i=0}^{N-1} (x_i - g_x)^2$$

$$C_{xy} = \frac{1}{N} \sum_{i=0}^{N-1} (x_i - g_x)(y_i - g_y)$$

$$C_{yx} = \frac{1}{N} \sum_{i=0}^{N-1} (y_i - g_y)(x_i - g_x)$$

$$C_{yy} = \frac{1}{N} \sum_{i=0}^{N-1} (y_i - g_y)^2$$

Equation 4 calculates the lengths of the two principle axes, $\lambda_1$ and $\lambda_2$.

$$\lambda_1 = \frac{1}{2}\left[C_{xx} + C_{yy} + \sqrt{(C_{xx} + C_{yy})^2 - 4(C_{xx}C_{yy} - C_{xy}^2)}\right] \qquad \text{(Eq. 4)}$$

$$\lambda_2 = \frac{1}{2}\left[C_{xx} + C_{yy} - \sqrt{(C_{xx} + C_{yy})^2 - 4(C_{xx}C_{yy} - C_{xy}^2)}\right]$$

Equation 5 calculates eccentricity, E.

$$E = \lambda_2/\lambda_1 \qquad \text{(Eq. 5)}$$

For example, for the portable fan V-I trajectory 44 of FIG. 3, the eccentricity value, E, is calculated to be 0.28.

Another example load feature thinness, T, is defined by Equation 6.

$$T = 4\pi A/P^2 \qquad \text{(Eq. 6)}$$

wherein:
A is area of a shape; and
P is perimeter of the shape.

Example features defined by polynomial coefficients are established by polynomial curve fitting, which finds the coefficients of a normalized voltage of degree n that fits the normalized voltage to normalized current. Table 1 includes two examples of V-I trajectories 46, 48 (as shown in FIGS. 4 and 5) in which their third order polynomial coefficients show distinct results.

TABLE 1

Figure 4:
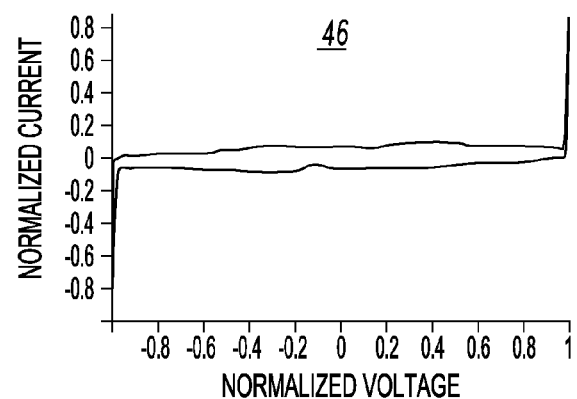
FIG. 4 is a plot of a V-I trajectory of a printer.
Figure 5:
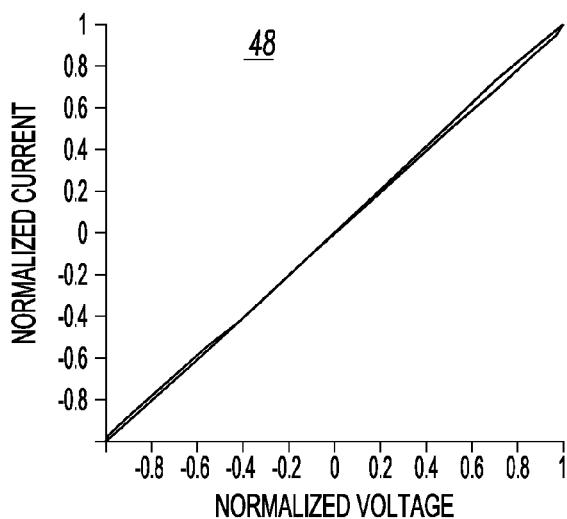
FIG. 5 is a plot of a V-I trajectory of an incandescent lamp.
Figure 6A:
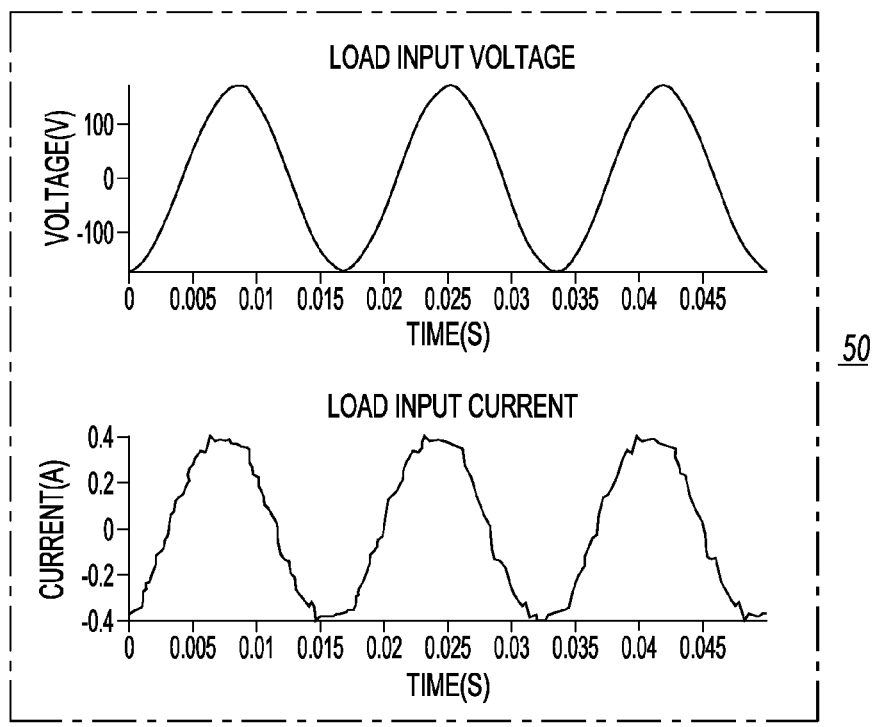
FIGS. 6A-6E are plots of measured voltage and current waveforms versus time for a portable fan, a shredder, a DVD player, a battery charger, and a set top box, respectively.
Figure 6B:
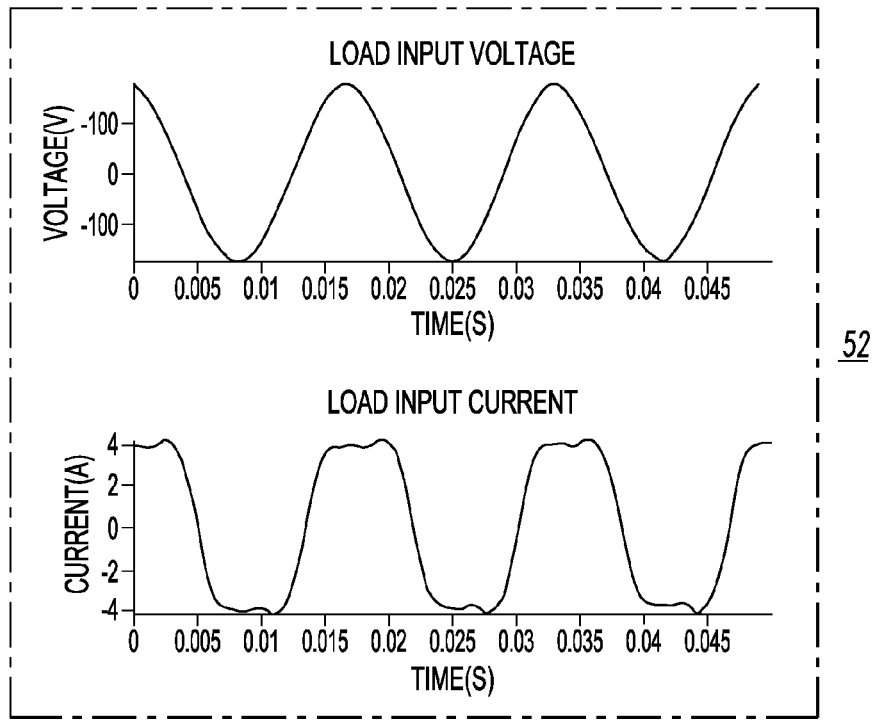
Figure 6C:
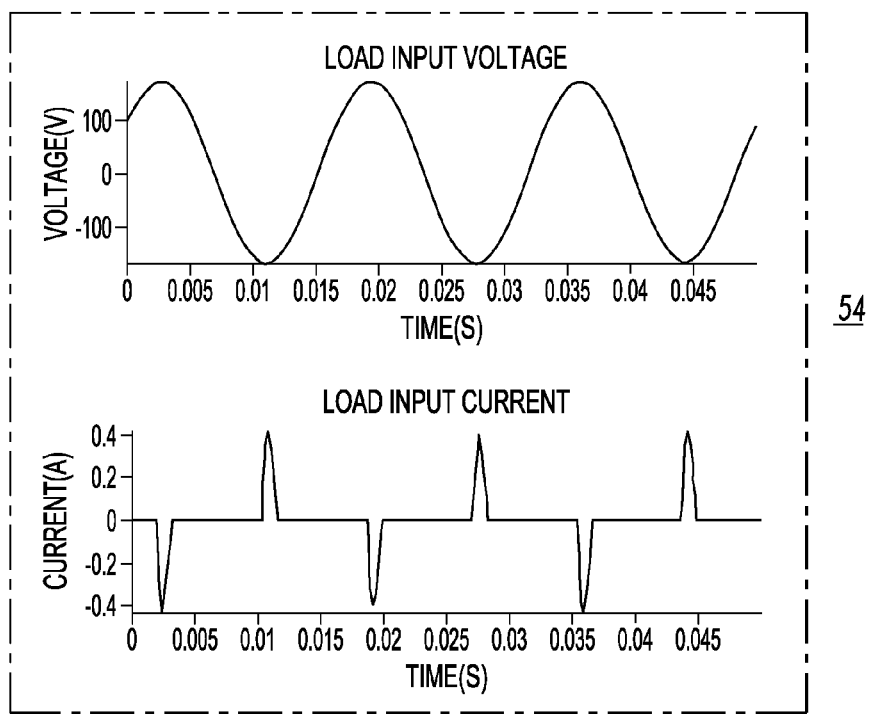
Figure 6D:
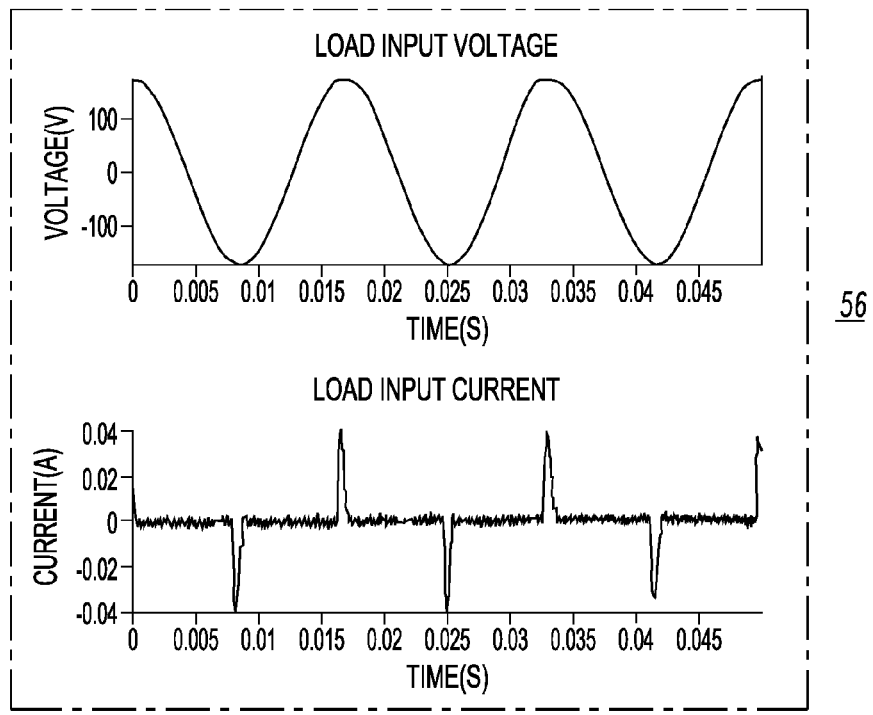
Figure 6E:
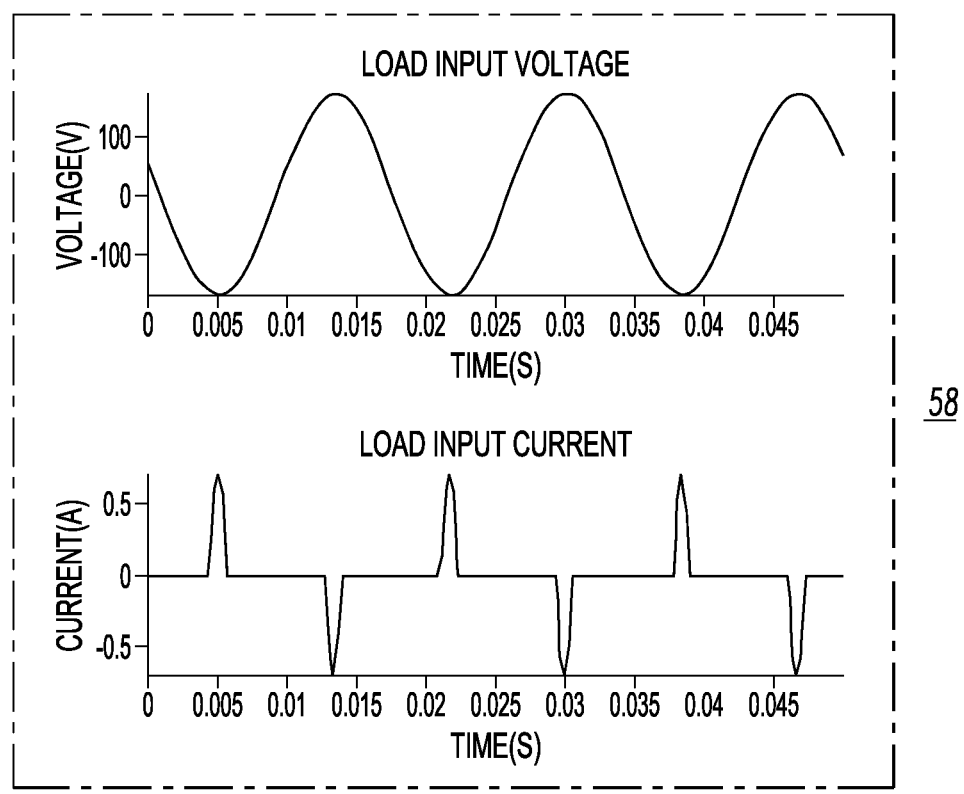

| Type of load | V-I Trajectory | Third Order Polynomial Coefficients | | | |
|---|---|---|---|---|---|
| | | A | B | C | D |
| Printer | FIG. 4 | 0.5575 | 0.0921 | −0.1846 | −0.0473 |
| Incandescent lamp | FIG. 5 | −0.0730 | 0.0202 | 1.0673 | −0.0229 |

Tables 2-4 show examples of high-dimensional features that are selected for the example first layer 6 load category, as well as for the example layers 8, 10 load sub-category/load type. The load feature ranges for each load category and sub-category are also given in Tables 2-4. Table 2 is an example of the selected load category feature ranges for the first layer 6 and includes minimum and maximum values of the four polynomial coefficients A-D and admittance. Table 3 is an example of the selected load category feature ranges for the X category of Table 2 for layers 8, 10 and includes thinness and admittance. Table 4 is an example of the selected load category feature ranges for the NP category of Table 2 for layers 8, 10 and includes minimum and maximum values of the four polynomial coefficients A-D, admittance, and P/Q ratio (i.e., the ratio between real power and reactive power).

TABLE 2

| Layer 1 Load Category | Poly Coeff. A | | Poly Coeff. B | | Poly Coeff. C | | Poly Coeff. D | | Admittance (Mho) | |
|---|---|---|---|---|---|---|---|---|---|---|
| | Min | Max | Min | Max | Min | Max | Min | Max | Min | Max |
| NP: | −0.746 | 0.994 | −0.079 | 0.164 | −0.443 | 0.164 | −0.085 | 0.016 | 0.000 | 0.023 |
| X: | −0.278 | 0.218 | −0.031 | 0.130 | 0.094 | 1.088 | −0.037 | 0.051 | 0.002 | 0.123 |
| P: | −0.770 | 0.984 | −0.145 | 0.172 | −0.430 | 1.656 | −0.078 | 0.044 | 0.000 | 0.036 |
| M: | −0.230 | 0.784 | −0.046 | 0.143 | 0.113 | 0.940 | −0.077 | 0.027 | 0.001 | 0.124 |
| R: | −0.634 | 0.156 | 0.004 | 0.058 | 0.847 | 1.098 | −0.036 | 0.021 | 0.002 | 0.126 |

TABLE 3

| X-Category | Thinness | | Admittance (Mho) | |
| --- | --- | --- | --- | --- |
| | Min | Max | Min | Max |
| Fan | −7.366E−05 | 1.169E−02 | 3.520E−05 | 1.581E−02 |
| Shredder | 6.393E−03 | 8.344E−03 | 2.729E−02 | 3.065E−02 |

TABLE 4

| NP - Category | Poly Coeff. A | | Poly Coeff. B | | Poly Coeff. C | |
| --- | --- | --- | --- | --- | --- | --- |
| | Min | Max | Min | Max | Min | Max |
| DVD Player | −7.78E−01 | 8.35E−01 | −1.74E−02 | 2.70E−01 | −3.91E−01 | 1.64E+00 |
| Set Top Box | 5.47E−01 | 9.71E−01 | −4.43E−03 | 2.35E−02 | −4.47E−01 | −2.36E−01 |
| Battery Charger | −3.23E−01 | 5.64E−01 | −2.01E−01 | 2.28E−01 | −1.40E−01 | 3.60E−01 |

| NP - Category | Poly Coeff. D | | Admittance (Mho) | | P/Q Ratio | |
| --- | --- | --- | --- | --- | --- | --- |
| | Min | Max | Min | Max | Min | Max |
| DVD Player | −1.17E−01 | 6.63E−03 | 1.39E−04 | 7.97E−03 | 1.16E−01 | 4.32E+00 |
| Set Top Box | −1.21E−02 | −1.43E−03 | 9.64E−04 | 4.94E−03 | 2.54E−01 | 4.38E−01 |
| Battery Charger | −1.33E−01 | 6.88E−02 | 1.25E−04 | 2.86E−04 | 6.58E−02 | 1.81E−01 |

TABLE 5

| X - Category | Thinness | Admittance | Coeff. A | Coeff. B | Coeff. C | Coeff. D |
| --- | --- | --- | --- | --- | --- | --- |
| Fan | −7.34E−05 | 2.27E−03 | 8.07E−03 | 4.99E−03 | 9.08E−01 | −3.90E−03 |
| Shredder | 8.94E−03 | 2.70E−02 | −1.83E−01 | 2.30E−02 | 1.11E+00 | 1.09E−02 |

TABLE 6

| NP - Category | Coeff. A | Coeff. B | Coeff. C | Coeff. D | Admittance | P/Q Ratio |
| --- | --- | --- | --- | --- | --- | --- |
| DVD Player | 3.38E−01 | 1.45E−02 | −1.59E−01 | −1.19E−02 | 1.39E−04 | 1.16E−01 |
| Set Top Box | 6.76E−01 | 1.01E−02 | −3.14E−01 | −8.76E−03 | 1.44E−03 | 2.74E−01 |
| Battery Charger | 5.64E−01 | 5.93E−02 | −1.40E−01 | −5.37E−02 | 1.32E−04 | 8.18E−02 |

FIGS. 6A-6E respectively show the measured voltage/current waveforms 50,52,54,56 and 58 for a portable fan, a shredder, a DVD player, a battery charger, and a set top box.

The calculated features for these five loads are presented in Tables 5 and 6.

The examples, above, employ a common table for each of the two example layers 8,10, although a relatively finer granularity load classification/identification can be employed. For example, although three example layers 6,8,10 are shown, the number of layers can be four or greater. Also, the hierarchical layers may go deeper depending on the level of granularity that can be achieved. This can present the opportunity to achieve a scalable load ID.

For real-time load type identification, the online identification process 34 acts (e.g., without limitation, as a search engine) to identify the load that is being monitored by relating a real-time extracted high-dimensional feature vector to the hierarchical load feature database 4. The basic process includes: (1) real-time measuring of current/voltage waveforms of a load being monitored; (2) extracting the high-dimensional feature vector of the load; (3) selecting the first layer feature set, and identifying which load category the monitored load belongs to in the first layer 6; (4) selecting the second layer feature set (which may be different than the first layer feature set), and identifying which load sub-category the monitored load belongs to in the second layer 8; and (5) selecting the bottom layer feature set (which may be different than the first and second layer feature sets), and identifying the load type 36 as defined in the bottom layer 12. Items (3) to (5) provide online identification of the load type 36. These can also provide online identification of the load operating mode 60 (e.g., without limitation, off, standby, on) and load health.

The above results validate that the calculated load features fall into the load feature ranges of the corresponding load category and sub-category, as shown in Tables 2-4 and 5 and 6, and the load type 36 is able to be identified through the load category/type classification and identification from layer 6 to layer 10.

The load category/type classification and identification can be implemented by a wide range of machine learning and pattern recognition processes, such as, for example and without limitation, artificial neural network processes, support vector machine processes, and proximity analysis processes.

In the disclosed concept, a different set of load features is advantageously employed for each load category and each sub-category classification/identification.

FIG. 2 and the above example features for each load category layer represent non-limiting examples of defining load categories and constructing a hierarchical load feature database 4 by selecting suitable features for each category. However, there are other example ways to define load categories, such as based on electric code and regulation standards. For instance, the IEC 61000-3-2 Standard classifies appliances into four classes mainly based on their power consumption and harmonics.

In FIG. 2, PFC represents Power Factor Correction, MFD represents Multiple Functional Device, and TXM represents Transformer.

Figure 7:
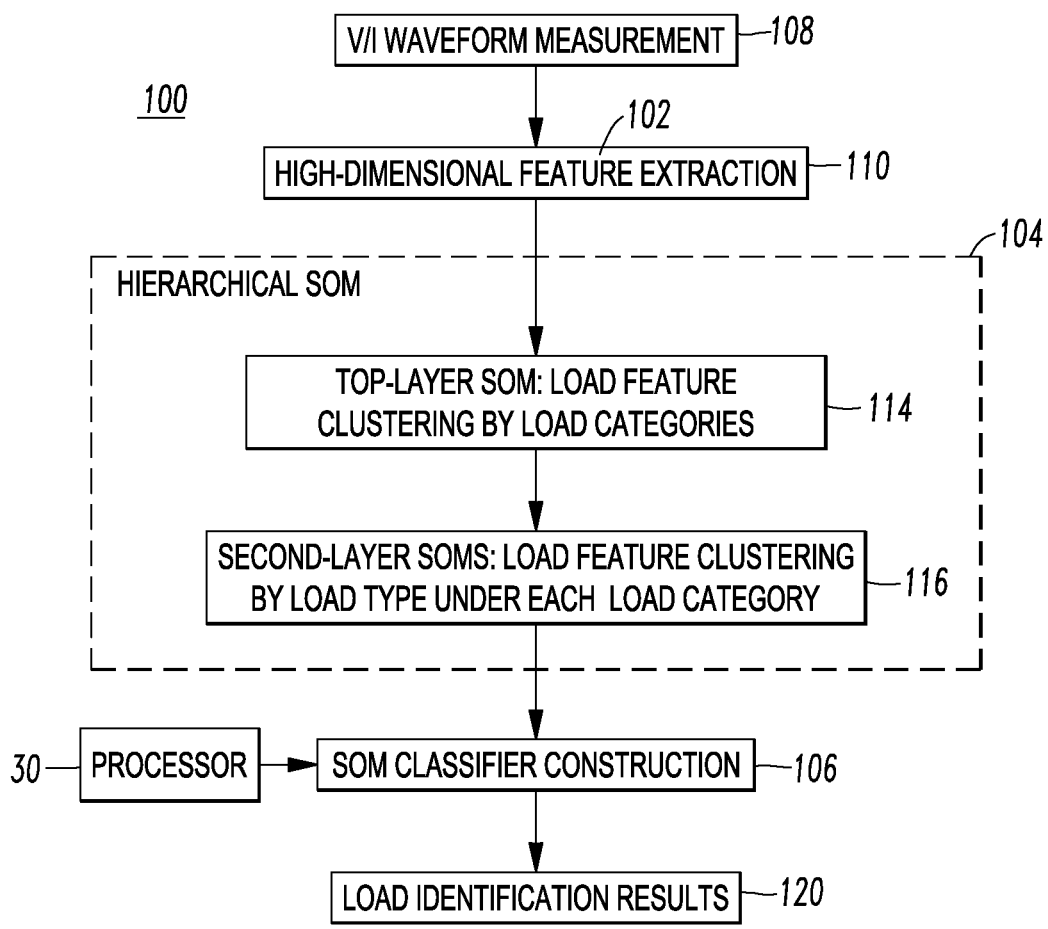
FIG. 7 is a block diagram of a self-organizing map (SOM) based load classification/identification system in accordance with embodiments of the disclosed concept.

Referring to FIG. 7, the disclosed concept provides a Self-Organizing
Map (SOM) based MELs classifier/identifier system 100 that extracts a relatively high-dimensional load feature vector 102 that is extracted to uniquely represent each reference load type in a feature space. SOM is an ideal unsupervised training method to construct an optimized load feature reference database by providing a convenient 2-D or 3-D representation of a relatively high-dimensional load feature database, such as database 4 of FIG. 2. This enables a simple and relatively fast online load classification/identification for real-time implementation. To reduce the crowdedness in the resultant SOM, a hierarchical SOM 104 is employed.

SOM is an ideal self-clustering tool, but is not designed as a classifier. Hence, the disclosed concept preferably extends the basic SOM to be supervised and employs a suitable decision-making distance metric to construct an effective classifier based on SOM.

The disclosed concept includes: (1) structuring a relatively high-dimensional feature space 104 of MELs, in order that the relatively high-dimensional feature vector of each load (extracted from the measured current/voltage signals of each load) can be used to uniquely distinguish itself from other loads; and (2) use of an SOM based algorithm for load feature clustering in the SOM 104 and load classification/identification 106 to enable an optimized load feature reference database, and a relatively fast and simple real-time implementation.

The SOM based load classification/identification system 100 includes V/I waveform measurement 108. The system 100 also includes: (1) relatively high-dimensional load feature extraction 110; (2) an input relatively high-dimensional space is related to an output, for example and without limitation, 2-D map (or 2-D lattice of neurons 112) (FIG. 8B); (3) the hierarchical SOM 104 having a top-layer SOM 114, with load feature clustering by load categories, and second-layer SOMs 116, with load feature clustering by load type under each load category; and (4) the SOM classifier construction 106, which preferably employs a suitable distance metric 118 to provide (5) load identification results 120.

Still referring to FIG. 7, relatively high-dimensional load feature extraction 110 proceeds as follows. Different features/signatures of MELs are investigated and extracted from the actual operational currents and voltages of loads, including the following aspects of load characteristics: (1) steady state current waveform and power quality related quantities; (2) voltage-current (V-I) trajectory graphical representation under start-up and steady-state conditions; (3) transient state characteristics of load current, including short-term harmonic contents, and transient power contents; and (4) load event detection, operating status profile, and operating modes patterns. The main objective of the load feature extraction 110 is to select a relatively high-dimensional load feature space, in order that every cluster of load feature vectors can uniquely represent one type of load in the reference load database 4 (FIG. 2).

In the second part of the system, SOM uses a relatively low-dimensional grid, such as 112 (FIG. 8B), of neurons 124 (FIGS. 8A and 8B) to capture and represent relatively high-dimensional input data (e.g., a relatively high-dimensional load feature space for identification of electric loads). This mapping preserves topological properties in vector space. During a training process, all neurons compete for the right to respond to the input data, although only one neuron will win at a time. The training result of a basic SOM is a low-dimensional (e.g., without limitation, typically, two-dimensional), discrete grid of neurons with similar characteristics as for training samples from the training process.

Figure 8A:
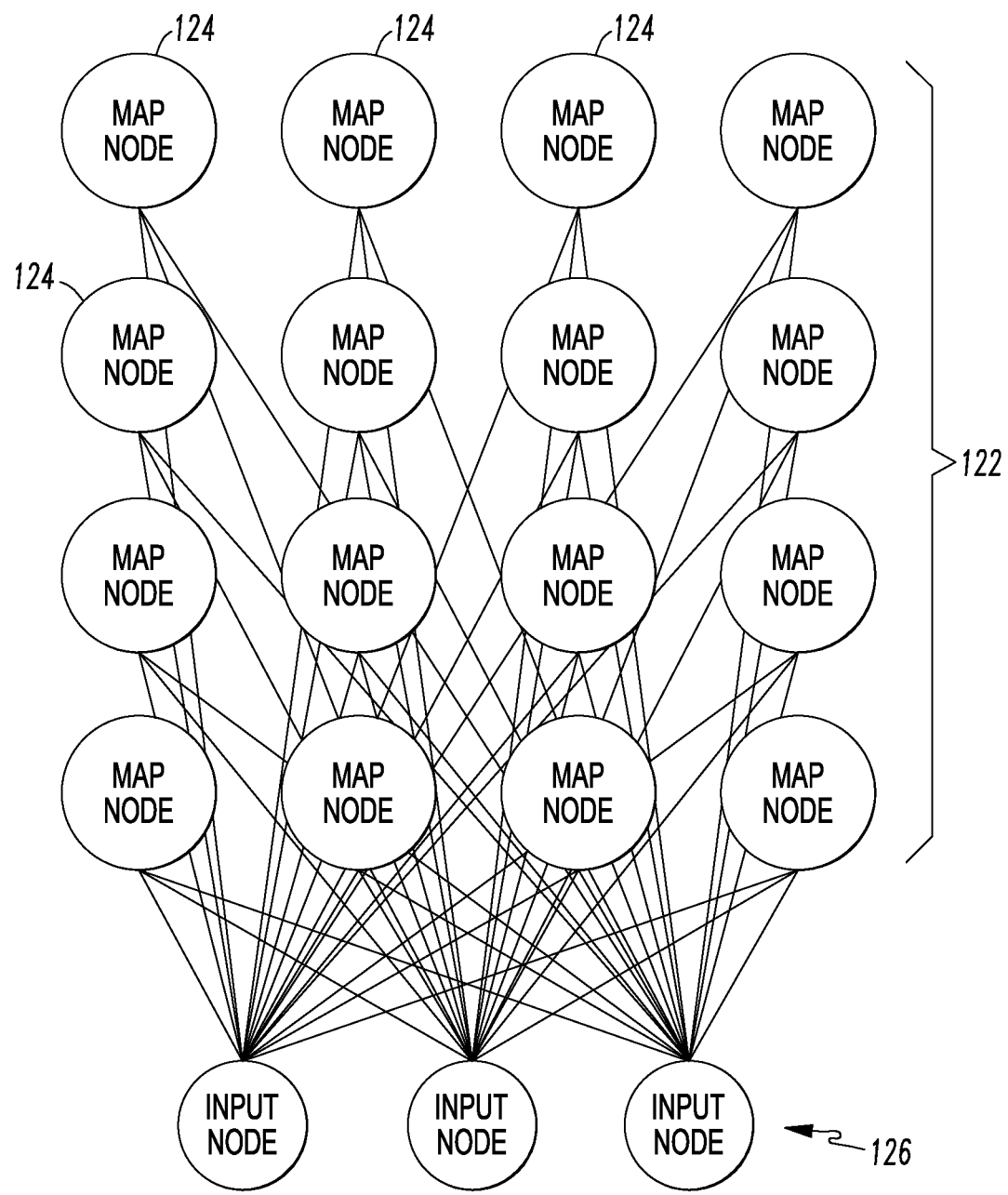
FIG. 8A is representation of a basic SOM structure.
Figure 8B:
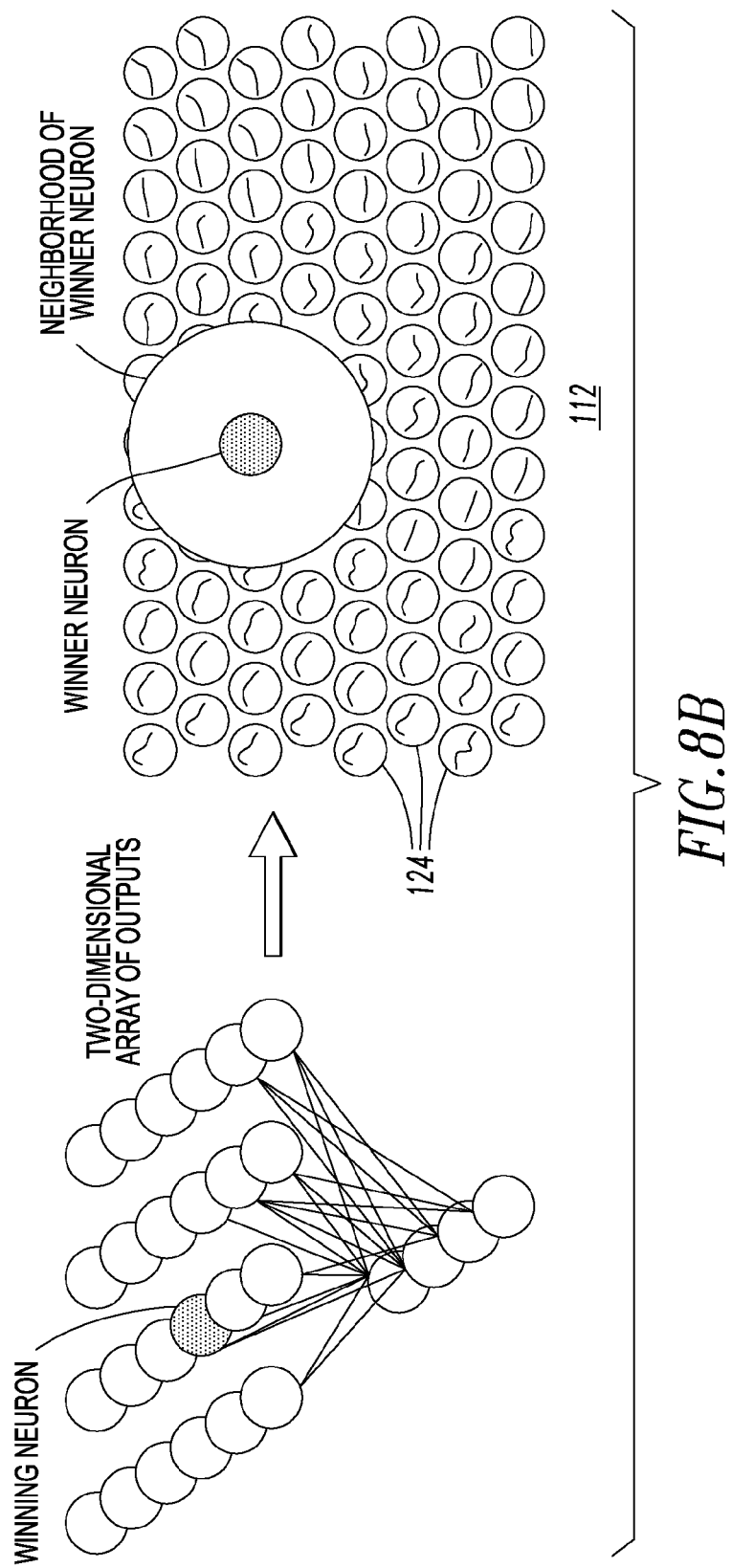
FIG. 8B is a representation of SOM showing how an input relatively high-dimensional space is related to an example output 2-D map (or 2-D lattice of neurons).

FIG. 8A shows an example 4-by-4 neuron map 122. Each neuron 124 is fully connected to the input layer 126. Each neuron 124 could either possess unique characteristics or belong to a subgroup of other neurons 124.

Each neuron 124 in the SOM grid 112 (FIG. 8B) is assigned with: (1) a topological position (i.e., an x-y coordinate in the example two-dimensional output grid), which is fixed during training; (2) a parametric reference (also called model or codebook) vector of weights of the same dimension as the input training data, which is time-varying during training; and (3) a fixed neighborhood function which defines a neighborhood (e.g., without limitation, a circle or a square in the example two-dimensional output grid) centered at a neuron with a relatively large initial radius, but decreasing with time, which is a unique feature of the SOMs 114 or 116 (FIG. 7). At each time step, if a neuron is the winner, then all neurons within its radius will update their weights. This method of training is called a "winner-takes-all" strategy.

An SOM, such as 114 or 116 (FIG. 7), can have K neurons in the output grid 112 (FIG. 8B), where K is a suitable positive integer. For neuron i, if the training data consists of vectors x of l-dimensions, $x=[x_1, x_2, x_3, \ldots, x_l]$, then each neuron is assigned a corresponding weight vector m also of l-dimensions:

$$m_i = [m_{i1}, m_{i2}, m_{i3}, \ldots, m_{il}].$$

Before the training process starts, the $m_i$ values are initialized. A suitable choice of the initial values can make the training process converge in a stable and relatively fast manner.

There are two versions of the basic SOM training algorithm: the original incremental training, and the batch training. The following describes the basic incremental SOM training algorithm, which has seven steps. First, all neurons' weight vectors $m_i$, are initialized, where $i=1, 2, \ldots, K$.

Second, an input vector of data $x=[x_1, x_2, x_3, \ldots, x_l]$ is chosen randomly from the training data and is presented to all of the neurons via variable scalar weights $\mu_{ij}$, which are generally different for different neurons.

Third, every neuron is examined to calculate which one possesses a weight vector that is closest to the input vector in the sense of minimum distance. In some embodiments, the Euclidean distance function d is used to measure closeness, with k being an index of the various dimensions l, such that:

$$d(m_i, x) = \sqrt{\sum_{k=1}^{l} (m_{ik} - x_k)^2}.$$

Fourth, the so-called "winning neuron" is the one for which d is a minimum. Signified by the subscript c, the winning neuron is the "Best Matching Unit" (BMU):

$$c = \arg\min\{\|x - m_i\|\}.$$

Then, the radius of the neighborhood $N_c(t)$ of the BMU c is calculated according to the neighborhood function $h_{c,i}(t)$, where i denotes any other neuron than the BMU. This neighborhood function is selected such at $h_{c,i}(t) \to 0$ when $t \to \infty$. Usually $h_{c,i}(t)$ is chosen as a function of the distance between $r_c$ and $r_i$, where between $r_c$ and $r_i$ are the location vectors of neurons c and i, respectively. For example, the neighborhood function can be written in the Gaussian form:

$$h_{c,i}(t) = \alpha(t) \cdot \exp\left(-\frac{\|r_c - r_i\|^2}{2\sigma(t)}\right),$$

wherein:

α(t) is another scalar-valued "learning rate factor" that is monotonically decreasing with time; and σ(t) defines the width of the kernel which corresponds to the radius of the neighborhood $N_c(t)$; this is usually set to a relatively high value early in the training process to produce a rough training phase.

Sixth, any neuron that has a Euclidean distance to the BMU less than the neighborhood radius is considered to be inside of the BMU's neighborhood and its weight vector is adjusted to make it resemble the input vector more closely. The closer a neuron is to the BMU, the more the neuron's weight vector gets altered during the training process:

$$m_i(t+1) = m_i(t) + h_{c,i}(t)[x(t) - m_i(t)],$$

wherein:

t=0, 1, 2, . . . is an integer denoting the discrete time index.

Seventh and finally, the second step, above, is repeated for N iterations, where N is the total number of input training vectors of data x presented to the SOM 104 (FIG. 7). N may exceed the number of data vectors in the database 4 of FIG. 2, in which case the training vector is each time selected randomly from the data vector base. Past experience shows that for good performance N should be at least about 500 times the number of neurons 124 (FIGS. 8A and 8B).

Figure 10:
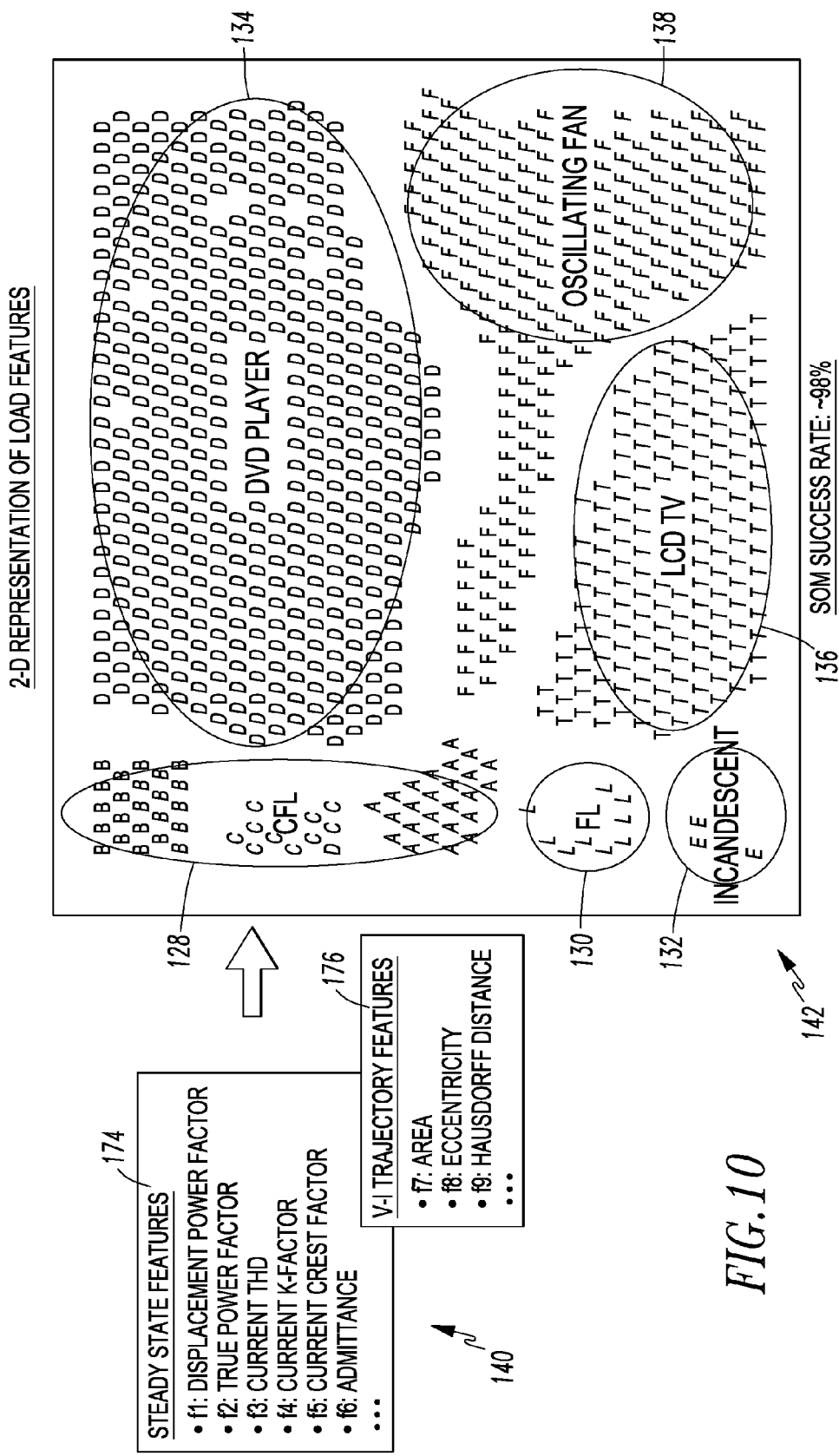
FIG. 10 is a representation of an example nine-dimension load feature vector including steady state and V-I trajectory features and a two-dimensional representation of load features for six example load types in accordance with an embodiment of the disclosed concept.

One of the main advantages of SOM is that SOM is able to cluster load features by nature. In other words, by applying a neighborhood function scheme, SOM is not only able to distinguish the difference between clusters of load features, but also to organize the similarity among the features by preserving the topological properties of the input space. This means that data points that are relatively close or share relatively many common features in the input space are mapped to neurons that are positioned close to one another to form a so-called cluster. Examples of load clusters 128,130,132,134, 136,138 are shown in FIG. 10. The SOM 104, therefore, converts complex, nonlinear statistical relationships between relatively high-dimensional data items into relatively simple geometric relationships on, for example and without limitation, a two-dimensional grid. As it thereby compresses information, while preserving the most important topological and metric relationships, the SOM 104 can also be considered to produce some degree of abstractions. This advantage is especially beneficial to MELs identification, because the resultant map provides a natural tolerance to the possible diversities of same load type, but from different MEL manufacturers with different power ratings.

Figure 9:
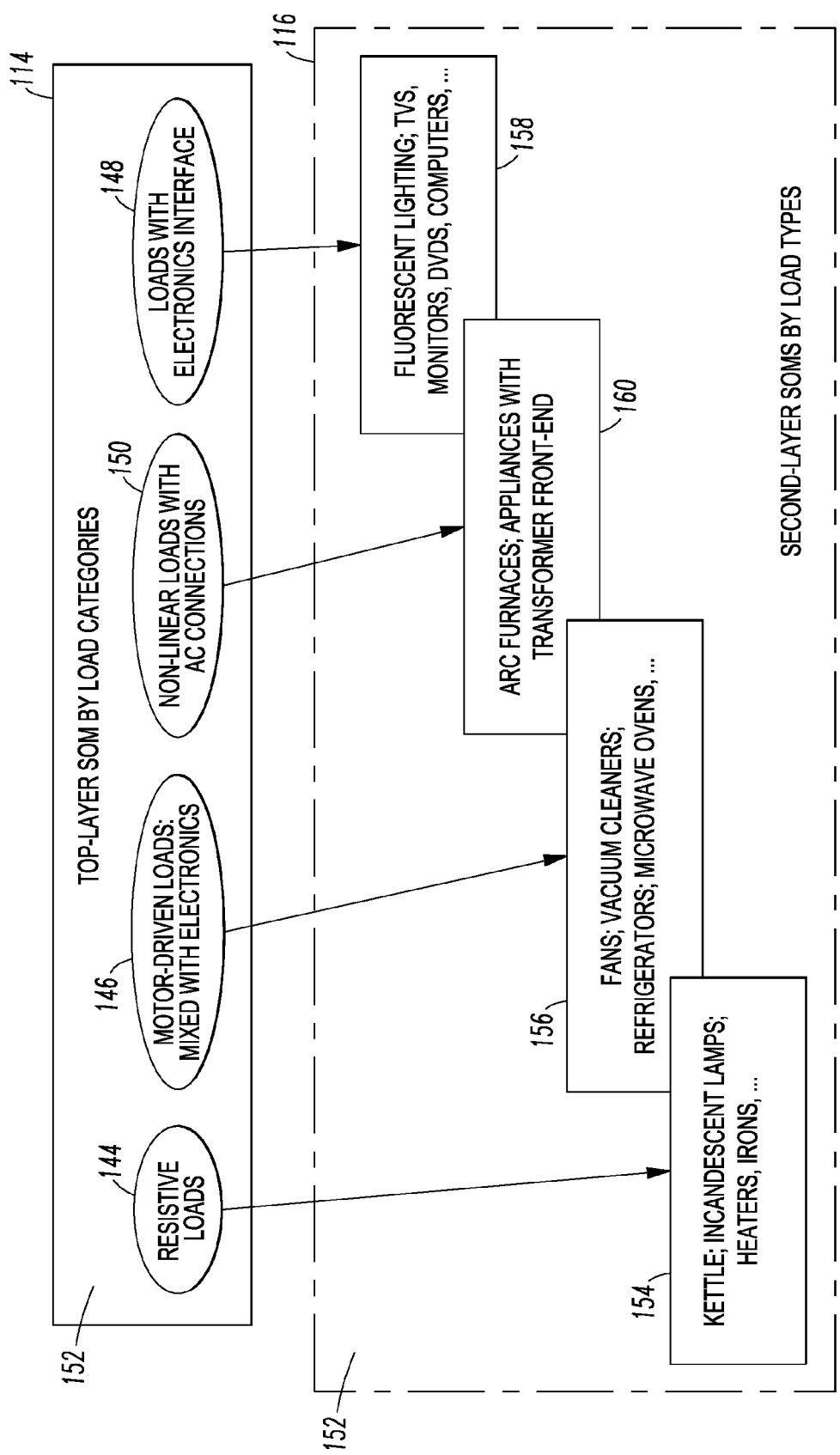
FIG. 9 is a block diagram showing a hierarchical SOM structure for MELs identification in accordance with an embodiment of the disclosed concept.

Referring to FIG. 9, after the relatively high-dimensional load feature space is selected, SOM is used to map the relatively high-dimensional load feature data or vector 102 to a relatively low-dimensional (e.g., without limitation, 2-D or 3-D) space by implementing a competitive and unsupervised training process to cluster and organize all the load features in a resultant, say 2-D, map. How the input relatively high-dimensional space 140 is related to the output 2-D map (or 2-D lattice of neurons) 142 is shown in FIG. 10.

As the number of reference load types increases, the result map gets crowded. As a result, a hierarchical SOM 104 of FIG. 7 is employed. FIG. 9 shows one example of a suitable SOM structure, where the first layer SOM 114 can include the following example load categories: (1) resistive appliances 144; (2) motor driven appliances 146; (3) electronically fed appliances 148; (4) non-linear loads 150 with direct AC connections; and (5) unknown 152 (others). The second layer 116 includes four example sub-SOMs 154,156,158,160, each of which represents the load type reference database of one load category 144,146,148,150. Each sub-SOM 154,156,158,160 contains the load feature reference database for all load types that belong to one load category.

There are several advantages of this proposed structure. The structure helps to reduce the crowdedness of the resultant SOMs. It enables the load identification to be expanded and scaled-up as the number of load types increases. Last, but not least, it facilitates the subtle feature extract/selection for loads especially with the most similarities.

FIG. 7 shows the SOM classifier 106. SOM is an ideal self-clustering tool, but is not believed to be an effective classifier. A known distance metric, called a unified distance matrix (U-matrix), can be used to setup the boundaries among all the clusters 128,130,132,134,136,138 in the map 142. There are several disadvantages associated with this metric. As the value of each entry of U-matrix is defined to be the average distance/difference from itself to adjacent entries, the boundaries tend to be ambiguous (e.g., not crisp). At the same time, this does not provide an identification confidence level criteria, which is discussed below in connection with Equation 10.

Figure 11:
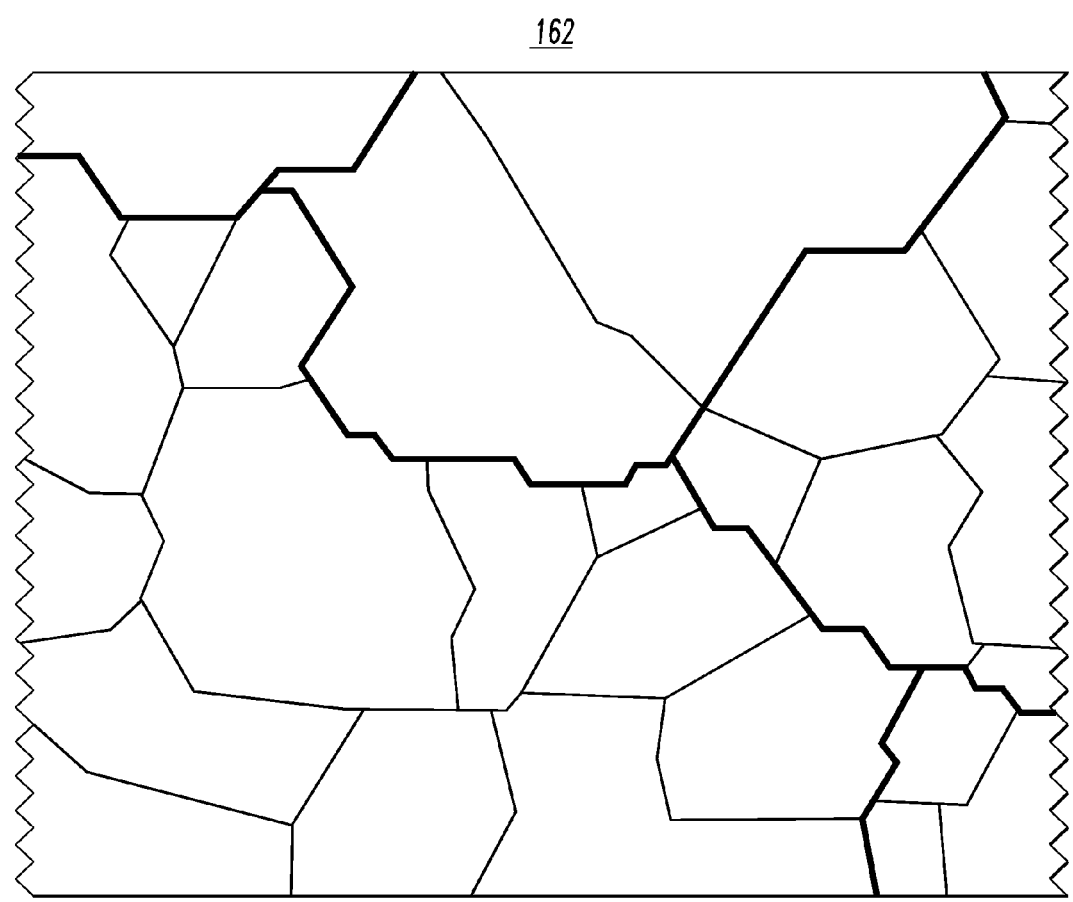
FIG. 11 is a representation of a U-matrix.
Figure 12:
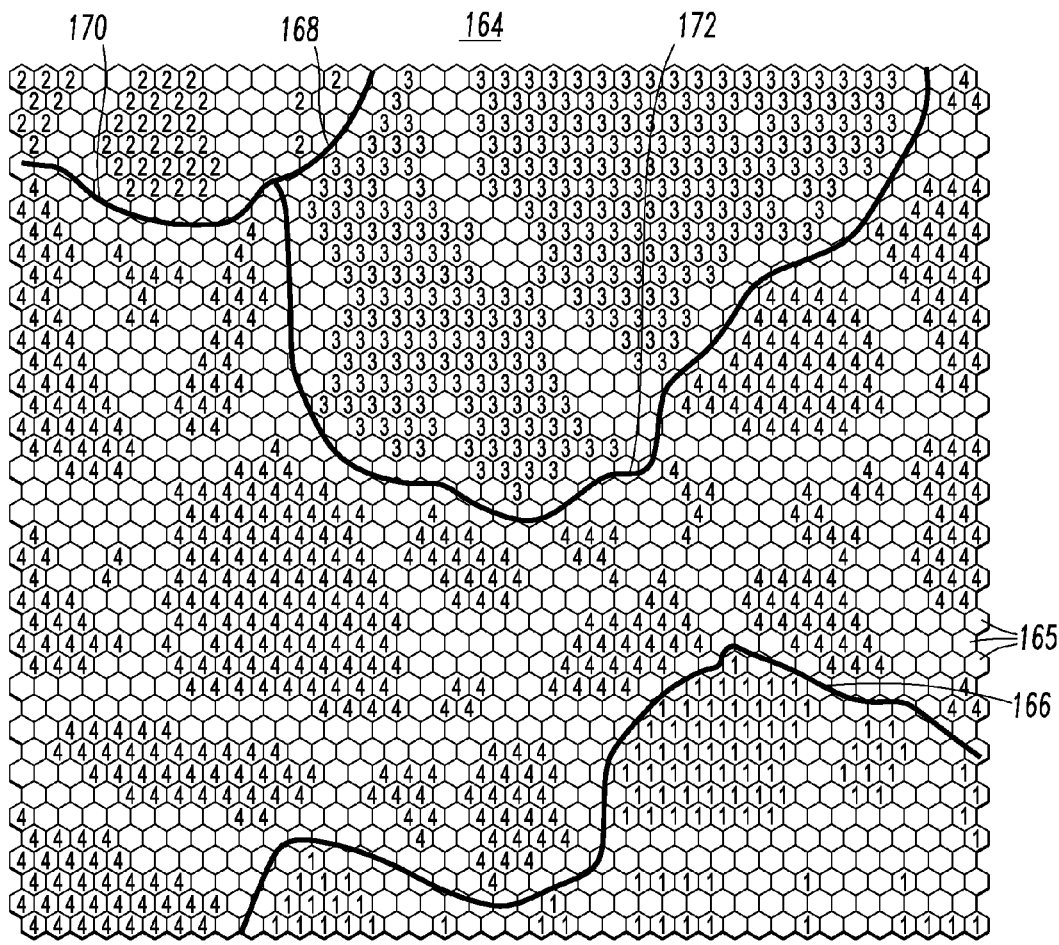
FIG. 12 is a corresponding labeling map of all neurons for the U-matrix of FIG. 11.

Another advantage of SOM is that the boundaries among the clusters 128,130,132,134,136,138 in the map 142 define the un-identified (unknown) loads automatically. The U-matrix is a known conventional way to represent information about an SOM. The U-matrix illustrates the weight vectors in the SOM by showing the distances between adjacent pairs of neurons. For each neuron, the distance between itself and its adjacent neurons (the number of which depends on its neighborhood topology) is calculated and presented with different colorings (not shown) or a gray scale image (not shown). An example U-matrix 162 is shown in FIG. 11, and its corresponding labeling map 164 of all neurons 165 is shown in FIG. 12, in which the boundaries are manually marked out by curves 166,168,170,172. In FIG. 11, the example U-matrix 162 visualizes distances between neighboring neurons, and helps to see the cluster structure. The relatively darker regions (representing relatively high values) (not shown) indicate a cluster boundary. FIG. 12 shows the example labeling map 164 with labels.

As a non-limiting example, various load feature vectors of nine example loads are presented to an example 50-by-50 SOM for clustering. The loads are labeled as follows: (1) 2 set top boxes (STB) and 1 DVD player (labeled by "1" in FIG. 12); (2) 1 space heater (labeled by "2" in FIG. 12); (3) 1 plasma TV (labeled by "3" in FIG. 12); and (4) 1 LCD TV, 1 LED TV, 1 LCD monitor, and 1 desktop computer (labeled by "4" in FIG. 12).

FIGS. 11 and 12 show that the boundaries of clusters from the U-matrix 162 and the boundaries 166,168,170,172 from the labeling map 164 are matched. Relatively lighter regions (not shown) depict the relatively closely spaced neurons and relatively darker regions (not shown) indicate the relatively more distant neurons. Thus, groups of relatively light regions (not shown) can be roughly considered as being a cluster. The relatively dark regions (not shown), on the other hand, represent the boundary regions that are not identified with a cluster and correspond to gaps in the data.

The testing input data can be easily classified by looking at the best-match neuron (e.g., via an example Euclidean distance, or an example Mahalanobis distance metric as is discussed below in connection with Equation 7) from the resultant SOM of this data. If the point's best-match lies inside a cluster-region (i.e., a relatively light region) (not shown) on the U-Matrix 162, then the input data is classified to that cluster. If the best-match lies in a relatively dark region (not shown) in the U-matrix 162, then no classification of this point can be assigned. This is in particular the case if the dataset possesses new features (i.e., aspects that were not included in the data learned so far). With this approach, for example, outliers, erroneous or unknown data are easily detected.

The disclosed concept provides a decision-making technique of a distance metric of the average distance among the neurons. The disclosed concept preferably provides a suitable improved decision metric by taking advantage of statistical information of the data space. The basic SOM is trained by unsupervised learning as was discussed above. That is, the training data vectors are not labeled and no class identity information is attached or employed during the learning process. Such unsupervised SOMs are not intended for pattern recognition, but rather clustering, visualization and abstraction. In order to apply the SOM 104 to a statistical pattern recognition problem, the unsupervised SOM needs to be modified to be a so-called supervised SOM.

To make the SOM 104 (FIG. 7) supervised, it is assumed that there are M known classes of load types, $\omega_1, \omega_2, \ldots, \omega_2$, and that each input load feature vector is pre-assigned to one of the classes. Each input load feature vector x remains unchanged in its values, but is labeled by a string containing its pre-given class identity. The input load feature vector x is augmented to be $x_a = [x^T, x_q^T]^T$ where $x_q$ is the numerical class identity vector, and T is the matrix transpose operator. For instance, $x_q$ can be a unit vector with its components assigned to one of the known M classes. The augmented $x_a$ is used in training but only x is considered in classification. In other words, the load feature vector for training is extended to a greater dimension. When the training is finished, neurons that have become the BMU to one or more input vectors are classified into one of the classes by a voting mechanism. The voting mechanism means that if a neuron becomes the BMU to multiple input classes (each for probably multiple times), then it is classified into the class for which it has been the BMU for the greatest number of times. Neurons that have never been a BMU to any input vector are marked as "unclassified".

Formally, the supervised SOM includes: (1) M known classes of interested subjects, $\omega_1, \omega_2, \ldots, \omega_M$, with class identity labels $z_1, z_2, \ldots, z_M$, respectively; (2) K neurons, $n_1, n_2, \ldots, n_K$, with weight vectors $m_1, m_2, \ldots, m_K$, respectively; and (3) each weight vector $m_i$ is of 1 dimensions: $m_i = [m_{i1}, m_{i2}, m_{i3}, \ldots, m_{il}]$.

After training, a subset of $K_s < K$ neurons is classified by the voting mechanism, that is, each of them is classified into one of the pre-defined known classes. When an unknown load feature vector x is presented to the SOM 104 (FIG. 7), x is compared to all $K_s$ classified neurons and is classified to be within that same class as the neuron that has the minimum distance to x in the vector space.

Although the original SOM can be extended to supervised learning and classification, its nature leads to many limitations for the purpose of electric load identification. To fully utilize the information contained in the training data and to achieve relatively better classification performance, statistical distance measurement between point and point, between point and class, and between class and class can be adopted to replace the deterministic Euclidean distance function, as was discussed above. A modified training method can also improve the performance.

The training process of the supervised SOM (SSOM) is the same in nature as the training process of the unsupervised SOM; that is, to cluster the input feature patterns by their nature and then to classify them. However, because of possible diversities of same load type, but from different manufacturers with different power ratings, the input data from different classes may overlap with each other. In another words, a certain data vector in one class could have similar values as another data vector in another class, which could introduce an identification error. To fully utilize all the information (e.g., without limitation, average feature values and their variances) contained in the training data, the first step is to extract the statistical information. That is, as all the load feature vectors are labeled, the mean vector and the covariance matrix of the load feature vectors of each class can be computed.

For class $\omega_i$, let $y_i$ and $\Sigma_i$ denote the mean and covariance, respectively, of all vectors within this class. Then, the diversity information is contained in the M mean vectors and the M covariance matrices, which can be used in the initialization of the SOM 104. In the third step of the basic incremental SOM training algorithm, above, the Euclidean distance function is replaced with the known Mahalonobis distance function, which is a statistical distance measure. See Mahalanobis, P. C., "On the generalised distance in statistics," *Proceedings of the National Institute of Sciences of India*, vol. 2, 1936, pp. 49-55. This is a useful way of determining similarity of an unknown sample set to a known set. The Mahalonobis distance $d_M$ between two vectors x and y is given by Equation 7:

$$d_M(x,y)^2 = (x-y)^T \Sigma^{-1}(x-y) \tag{Eq. 7}$$

Equation 7 defines the Mahalanobis distance $d_M$ of the multivariate input load feature vector x from a neuron's weight vector y. The Mahalanobis distance (or "generalized squared interpoint distance" for its squared value in Equation 7) can also be defined as a dissimilarity measure between two random vectors x,y of the same distribution with the covariance matrix $\Sigma$. $\Sigma$ can uniformly take the average of the within-class covariance matrix for each class or the total covariance matrix of all training data. Considering the nature of the data available in the electric load identification problem, a more precise option is that if x is an input feature vector and y belongs to class $\omega_i$, then take $\Sigma = \Sigma_i$. In this way, the statistical information can be fully utilized.

After completing the training, the final step is to replace the Euclidean distance $d_E$ function with the following point-to-cluster function in the SSOM, where Tr( ) denotes the trace of a square matrix (which is the sum of the elements on the main diagonal from the upper left to the lower right of the square matrix).

$$d_E(x, \omega_i)^2 = (x-y_i)^T(x-y_i) + Tr(\Sigma_i) \tag{Eq. 8}$$

This is, in fact, the average squared Euclidean distance from the measured input load feature vector x to every point in class $\omega_i$. Then, the identification utilizes the statistical information contained in the training data.

SOM is an ideal self-clustering tool, but is not designed as an effective classifier. The identification decision made is hard (i.e., an absolute decision), and does not provide an identification confidence level criteria. This is not a desired result, since errors often exist and no classifier can give a desired 100% success rate. Instead, a soft decision may be desired, which will indicate the probability of a particular load belonging to a particular class. A hard decision can then be made based on the soft probabilities, if needed. This problem comes from the fact that although SOM employs a probability-related mapping, it does not model and use the input data distribution density. To solve this problem, a hybrid supervised SOM (SSOM)/Bayesian decision making framework is disclosed as follows.

The Bayesian decision theory is a statistical approach, which takes variation of the patterns as well as costs and risks into consideration and classifies an unknown pattern in the most probable sense. Given a classification task of M classes, $\omega_1, \omega_2, \ldots, \omega_M$, and an unknown pattern which is represented by a feature vector x, the Bayes classifier classifies x as $\omega_j$, which maximizes the conditional a posteriori probabilities:

$$\omega_j = \underset{i}{\operatorname{argmax}} Pr(\omega_i \mid x), i = 1, 2, \ldots, M,$$

which is usually called a maximum a posteriori (MAP) classifier. See Theodoridis, S. et al., "Pattern Recognition", Fourth Ed., Academic Press, 2008, ISBN: 978-1597492720. That is, each a posteriori probability represents the probability that the unknown pattern belongs to each respective class $\omega_i$, given that the observed feature vector is x. The Bayes rule is shown in Equation 9:

$$Pr(\omega_i \mid x) = \frac{p(x \mid \omega_i) Pr(\omega_i)}{p(x)} \quad \text{(Eq. 9)}$$

wherein:
$Pr(\omega_i)$ denotes the a priori probability of the respective class $\omega_i$, and
$p(x)$ is the probability density function (pdf) of x.
In a MAP classifier, $p(x)$ is not needed and is not taken into account during the classification. The a priori probabilities $Pr(\omega_i)$, i=1, 2, . . . , M, can be estimated from the available training feature data. Therefore, $p(x \mid \omega_i)$, the likelihood function of x with respect to an, is the only difficulty in the MAP classifier. Note that when the load feature vectors take only discrete values, the density function $p(x \mid \omega_i)$ becomes probabilities and is usually denoted by $Pr(x \mid \omega_i)$. In other words, an accurate estimation of the underlying environmental pdf needs to be derived from the available data.

It is well known that if the individual load features $x_j$, j=1, 2, . . . , l, are assumed to be statistically independent, then it is true to have:

$$p(x \mid \omega_i) = \prod_{k=1}^{l} p(x_k \mid \omega_i)$$

See Theodoridis, S. et al., above. A more descriptive term for the underlying probability model would be "independent feature model". Furthermore, an unknown feature vector $x=[x_1, x_2, x_3, \ldots, x_l]$ is classified to be the class:

$$\omega_m = \underset{\omega_i}{\operatorname{argmax}} \prod_{k=1}^{l} p(x_k \mid \omega_i), i = 1, 2, \ldots, M,$$

The above model is also called the Naive Bayes classifier. This assumes that the presence (or absence) of a particular feature of a class is unrelated to the presence (or absence) of any other feature of the same class. For an electric load identification problem, depending on the load feature set selected, the independence assumption could be reasonable.

The Naive Bayes classifier can be directly applied to the identification of electric loads without incorporating an SOM. In the disclosed concept, the Bayes decision theory is preferably combined with the disclosed SSOM. The advantage of utilizing the statistical information from the SOM neuron grid instead of directly using the training data is that the estimation of the pdf of x with respect to $\omega_i$, $p(x \mid \omega_i)$, can be greatly simplified while preserving accuracy and efficiency.

As was discussed above, one neuron is selected to be the BMU at each training step and is labeled to be the same class as the input load feature vector. When the training is complete, each neuron could have been the BMU to load feature vectors from several different pre-known classes and, thus, labeled differently or have never been a winner. This observation contains rich and important information, which has generally been ignored as the voting mechanism is applied when the training is completed to determine each neuron's final class label. For later reference, the history of each neuron, which records how many times it has been a BMU to input data vectors and to which class each data vector belongs, is called "the BMU history" information.

Although many known methods are available to estimate the pdf $p(x \mid \omega_i)$, they require a significant amount of computing resources and time. Furthermore, it is, in fact, not necessary to estimate a continuous pdf, but rather to estimate the values of the pdf at given conditions, and the latter is much faster and easier. The problem has, therefore, now degenerated to estimation of the probability of certain discrete values. This degeneration method is expected to work because of the fact that there is a relatively large amount of samples of x to make a sufficiently accurate estimation of the continuous density.

For example and without limitation, for a load feature set (i.e., of average values per cycle) where there are 3600 data points for each load and there are 10,800 data points available for training even if only three loads are involved. Considering the fact that x(t) is in the range of [0,1] at all times as well as the example, non-limiting predetermined resolution of the samples is only about $10^{-4}$, x(t) can be assumed to be quantized to x[k] at the level of about $10^{-4}$, where k is an index. Thus, there are $10^4$ values of x and part of them are observed in the samples (multiple times). Based on the number of observed times, the probability of each quantized value x with respect to each class can be calculated using the BMU history information. The probability of other unobserved values can be estimated using suitable methods, such as interpolation.

Formally, for each quantized x[k], assume that it appears a total of $T_k$ times, including $T_{k1}$ times for the BMU to class $\omega_1$, $T_{k2}$ times for the BMU to class $\omega_2$, . . . , and $T_{kM}$ times for the BMU to class $\omega_M$, then:

$$Pr(\omega_i \mid x[k]) \approx \frac{T_{ki}}{T_k} \quad \text{(Eq. 10)}$$

For quantized values x[k'] that have no BMU history, the value $Pr(\omega_i \mid x[k'])$ can be estimated using linear interpolation or other suitable nonlinear methods.

A test can be conducted to validate the above disclosed SSOM algorithm with an extended classification and decision-making mechanism. Three types of testing scenarios are considered: (1) a data file of a known load model that is also used in training, expecting 100% confidence and a 100% testing correct rate; (2) a data file of a known load model that is not used in training, but other data files of this model are used in training, expecting a relatively lower correct rate than the first testing scenario; and (3) a data file of a known load model, but never used in training, expecting a relatively lower correct rate than the second scenario.

The following types of loads were tested under the three scenarios above, and the preliminary results are summarized in Table 7. Eight non-limiting example steady state features used for this test include: (f1) displacement power factor; (f2) current total harmonic distortion (THD); (f3) current RMS value; (f4) current crest factor; (f5) current $3^{rd}$ order harmonic amplitude; (f6) current $3^{rd}$ order harmonic phase angle (with respect to voltage); (f7) current $5^{th}$ order harmonic amplitude; and (f8) current $5^{th}$ order harmonic phase angle (with respect to voltage).

TABLE 7

| Load Types | Scenario | Successful Rate | Likelihood Probability |
|---|---|---|---|
| Brand A LCD TV | #1 | 100% | 100% |
| Brand B Set Top Box | #1 | 100% | 100% |
| Brand C Microwave Oven | #1 | 100% | 100% |
| Brand D Space Heater | #1 | 100% | 100% |
| Brand E Laptop Computer | #2 | 91% | 98.8% |
| Brand F LCD TV | #3 | 99% | 100% |
| Brand G Microwave Oven | #3 | 97.3% | 98% |

FIG. 10 shows an example set of results by applying SOM for load classification and identification. The non-limiting example test loads include: (1) compact fluorescent lamp (CFL); (2) fluorescent lamp (FL); (3) incandescent lamp; (4) DVD player; (5) LCD television (TV); and (6) fan. The extracted relatively high-dimensional (e.g., without limitation, 9 dimensions) feature vector 140 is also shown.

Six non-limiting example steady state features 174 include: (f1) displacement power factor; (f2) true power factor; (f3) current total harmonic distortion (THD); (f4) current K-factor; (f5) current crest factor; and (f6) admittance (or the inverse of impedance (Z)).

The example current crest factor or peak-to-average ratio (PAR) or peak-to-average power ratio (PAPR) is a measurement of a waveform, calculated from the peak amplitude of the waveform divided by the RMS value of the waveform. It is therefore a dimensionless quantity. While this quotient is most simply expressed by a positive rational number, in commercial products it is also commonly stated as the ratio of two whole numbers, e.g., 2:1. In signal processing applications it is often expressed in decibels (dB). The minimum possible crest factor is 1, 1:1 or 0 dB. Crest factor can be used to detect the existence of a current pulse. A sharp peak corresponds to a relatively higher value of crest factor. The crest factor of a waveform is equal to the peak amplitude of a waveform divided by the RMS value:

$$C = |I_{peak}|/I_{rms}$$

wherein:
$I_{peak}$ is the current's peak amplitude; and
$I_{rms}$ is the current's RMS value.

Three non-limiting example V-I trajectory load features 176 include: (f7) area; (f8) eccentricity; and (f9) Hausdorff distance.

The Hausdorff distance, or Hausdorff metric, also called Pompeiu-Hausdorff distance, measures how far two subsets of a metric space are from each other. It turns the set of non-empty compact subsets of a metric space into a metric space in its own right. The Hausdorff distance is the longest distance one can be forced to travel by an adversary who chooses a point in one of the two sets, from where you then must travel to the other set. In other words, it is the farthest point of a set that you can be to the closest point of a different set.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of identifying electric load types of a plurality of different electric loads, said method comprising:
   providing a self-organizing map load feature database of a plurality of different electric load types and a plurality of neurons, each of said different electric load types corresponding to a number of said neurons;
   employing a weight vector for each of said neurons;
   sensing a voltage signal and a current signal for each of said different electric loads;
   determining a load feature vector comprising at least four different load features from said sensed voltage signal and said sensed current signal for a corresponding one of said different electric loads;
   identifying by a processor one of said different electric load types by relating the load feature vector to the neurons of said self-organizing map load feature database by identifying the weight vector of one of said neurons corresponding to said one of said different electric load types that is a minimal distance to the load feature vector;
   employing with said identifying the weight vector an average squared Euclidean distance to a plurality of neurons in a class corresponding to said one of said plurality of different electric load types;
   employing i as an index;
   employing $\omega_i$ as said class;
   employing x as said load feature vector;
   for each of said plurality of different electric load types, employing a group of values of said self-organizing map load feature database having a mean $y_i$ and a square covariance matrix $\Sigma_i$;
   employing with said identifying the weight vector a point-to-cluster function of average squared Euclidean distance from said load feature vector to every point in said class, $\omega_i$, corresponding to said one of said plurality of different electric load types;
   employing Tr( ) as a trace of the square covariance matrix $\Sigma_i$; and
   determining the average squared Euclidean distance from:

$$d_E(x,\omega_i)^2 = (x-y_i)^T(x-y_i) + Tr(\Sigma_i).$$

2. A method of identifying electric load types of a plurality of different electric loads, said method comprising:
   providing a self-organizing map load feature database of a plurality of different electric load types and a plurality of neurons, each of said different electric load types corresponding to a number of said neurons;
   employing a weight vector for each of said neurons;
   sensing a voltage signal and a current signal for each of said different electric loads;
   determining a load feature vector comprising at least four different load features from said sensed voltage signal and said sensed current signal for a corresponding one of said different electric loads;

identifying by a processor one of said different electric load types by relating the load feature vector to the neurons of said self-organizing map load feature database by identifying the weight vector of one of said neurons corresponding to said one of said different electric load types that is a minimal distance to the load feature vector;

training said self-organizing map load feature database with a statistical distance measure;

employing i as an index;

training said self-organizing map load feature database with x as an input load feature vector;

for each class of said plurality of different electric load types, employing a group of values of said self-organizing map load feature database having a mean $y_i$ and a square covariance matrix $\Sigma_i$;

employing as said statistical distance measure a Mahalanobis distance from said input load feature vector to the weight vector, y, of each of said neurons of said self-organizing map load feature database;

employing an average of a within-class square covariance matrix $\Sigma_i$ for the class that the weight vector of a corresponding one said neurons belongs to as the square covariance matrix of both said input load feature vector and the last said weight vector;

determining the Mahalanobis distance from:

$$d_M(x,y)^2 = (x-y)^T \Sigma^{-1} (x-y);$$

providing a plurality of samples of extracted load features from said sensed voltage signal and said sensed current signal for one of said different electric loads;

employing k as an index;

employing $\omega_i$ as said class;

quantizing said determined load feature vector as x'[k] based on a predetermined resolution;

identifying said quantified determined load feature vector x'[k] appearing in said samples a plurality, $T_k$, of times;

identifying said one of said different electric load types as a best match to said $\omega_i$ a plurality, $T_{ki}$, of times; and determining likelihood of said identifying by the processor of said one of said different electric load types from:

$$Pr(\omega_i \mid x'[k]) \approx \frac{T_{ki}}{T_k}.$$

* * * * *